US010184620B2

(12) United States Patent
Law et al.

(10) Patent No.: US 10,184,620 B2
(45) Date of Patent: Jan. 22, 2019

(54) BATTERY LIFE EXTENDER FOR PORTABLE LIGHTING

(71) Applicant: The Coleman Company, Inc., Wichita, KS (US)

(72) Inventors: Matthew G. Law, Wichita, KS (US);
Stuart L. Meether, Wichita, KS (US);
Thomas G. Trefz, Wichita, KS (US);
Mark Elliott, Park City, KS (US);
Michael D. Brockel, Wichita, KS (US);
Ricky J. Glazier, Cheney, KS (US);
Chelor Chen, Zhongchun Town (CN);
Yuhua Zhang, Xidian Town (CN)

(73) Assignee: The Coleman Company, Inc., Wichita, KS (US)

(*) Notice: Subject to any disclaimer, the term of this patent is extended or adjusted under 35 U.S.C. 154(b) by 114 days.

(21) Appl. No.: 15/144,573

(22) Filed: May 2, 2016

(65) Prior Publication Data
US 2016/0245466 A1 Aug. 25, 2016

Related U.S. Application Data

(63) Continuation-in-part of application No. PCT/US2014/069599, filed on Dec. 10, 2014.
(Continued)

(51) Int. Cl.
F21V 7/00 (2006.01)
F21V 17/12 (2006.01)
(Continued)

(52) U.S. Cl.
CPC .............. F21L 4/005 (2013.01); F21L 4/027 (2013.01); F21L 4/045 (2013.01); F21V 3/00 (2013.01);
(Continued)

(58) Field of Classification Search
CPC ..... F21L 4/005; H01M 10/425; H01M 10/44; H02J 7/0042; F21V 3/00
See application file for complete search history.

(56) References Cited

U.S. PATENT DOCUMENTS 614,318 A 11/1898 Bugg, Jr.
1,297,656 A 3/1919 Burgess
(Continued)

FOREIGN PATENT DOCUMENTS

DE 10315411 B4 1/2007
EP 0236649 A1 9/1987
(Continued)

OTHER PUBLICATIONS

Coleman, "Divide™ 250L LED Flashlight", Available online at: http://www.coleman.com/flashlights/divide250lledflashlight/2000020045.html.
(Continued)

Primary Examiner — Sharon E Payne
(74) Attorney, Agent, or Firm — Husch Blackwell LLP

(57) ABSTRACT

A battery life extender for a portable lighting device employs a reconfigurable mechanism operable to selectively electrically isolate one or more batteries from a circuit having a parasitic power drain. For example, a lighting device includes a light generating element, at least one battery, a user operated switch configured to control delivery of electrical power from the at least one battery to the light generating element, and a housing assembly supporting the at least one battery and the light generating element. The user operated switch can impart a parasitic power drain. The housing assembly is reconfigurable to: (a) a first configuration in which the user operated switch is electrically connected to the at least one battery, and (b) a second configuration in which the at least one battery is electrically isolated (Continued)

and the at least one battery is retained by the housing assembly.

12 Claims, 15 Drawing Sheets

Related U.S. Application Data

(60) Provisional application No. 61/970,062, filed on Mar. 25, 2014, provisional application No. 61/915,072, filed on Dec. 12, 2013.

(51) Int. Cl.

| | |
|---|---|
| *F21V 23/00* | (2015.01) |
| *F21L 4/00* | (2006.01) |
| *F21L 4/02* | (2006.01) |
| *F21L 4/04* | (2006.01) |
| *F21V 23/04* | (2006.01) |
| *H01M 2/10* | (2006.01) |
| *F21V 21/084* | (2006.01) |
| *F21V 23/02* | (2006.01) |
| *F21V 3/00* | (2015.01) |
| *F21V 5/04* | (2006.01) |
| *F21V 23/06* | (2006.01) |
| *H01M 10/42* | (2006.01) |
| *H01M 10/44* | (2006.01) |
| *H02J 7/00* | (2006.01) |
| *F21Y 115/10* | (2016.01) |
| *F21Y 101/00* | (2016.01) |

(52) U.S. Cl.
CPC ............... *F21V 5/04* (2013.01); *F21V 7/00* (2013.01); *F21V 17/12* (2013.01); *F21V 21/084* (2013.01); *F21V 23/009* (2013.01); *F21V 23/023* (2013.01); *F21V 23/0414* (2013.01); *F21V 23/0428* (2013.01); *F21V 23/06* (2013.01); *H01M 2/1055* (2013.01); *H01M 10/425* (2013.01); *H01M 10/44* (2013.01); *H02J 7/0042* (2013.01); *F21Y 2101/00* (2013.01); *F21Y 2115/10* (2016.08); *H01M 2220/30* (2013.01)

(56) References Cited

U.S. PATENT DOCUMENTS

| | | | |
|---|---|---|---|
| 1,363,924 A | 12/1920 | Saborsky | |
| 1,386,474 A | 8/1921 | Vince | |
| 1,398,799 A | 11/1921 | Recker | |
| 1,479,860 A | 1/1924 | Lewis | |
| 1,591,627 A | 7/1926 | Hopkins | |
| 1,595,146 A | 8/1926 | Ford | |
| 1,648,709 A | 11/1927 | Winsell | |
| 1,649,882 A | 11/1927 | Wolcott | |
| 1,875,048 A | 8/1932 | Levene | |
| 1,884,108 A | 10/1932 | Moran | |
| 1,895,913 A | 1/1933 | Buchholz | |
| 1,986,242 A | 1/1935 | Zook | |
| 2,008,915 A | 7/1935 | Langos | |
| 2,009,952 A | 7/1935 | Beaumont | |
| 2,027,912 A | 1/1936 | Kingsbury | |
| 2,120,238 A | 6/1938 | Brush | |
| 2,150,644 A | 3/1939 | Batcheller | |
| 2,180,228 A | 11/1939 | Florman | |
| 2,249,689 A | 7/1941 | Gelardin | |
| 2,258,074 A | 10/1941 | Swanson | |
| 2,277,866 A | 3/1942 | Sage | |
| 2,312,305 A | 3/1943 | Berlinger | |
| 2,363,825 A | 11/1944 | Yardeny | |
| 2,373,306 A | 4/1945 | Gits | |
| 2,435,689 A | 2/1948 | McCabe | |
| 2,483,665 A | 10/1949 | Phillips | |
| 2,736,793 A | 2/1956 | Raymond | |
| 2,765,396 A | 10/1956 | Iverson | |
| 2,816,215 A | 12/1957 | Jarred | |
| 2,867,717 A | 1/1959 | Forquer | |
| 3,244,871 A | 4/1966 | Feldman | |
| 3,355,582 A | 11/1967 | Swee | |
| 3,590,235 A | 6/1971 | Leo et al. | |
| 3,971,158 A | 7/1976 | Hanson et al. | |
| 4,114,187 A | 9/1978 | Uke et al. | |
| 4,241,384 A | 12/1980 | Diziere et al. | |
| 4,281,368 A | 7/1981 | Humbert et al. | |
| 4,286,310 A | 8/1981 | Brainkel et al. | |
| 4,306,277 A | 12/1981 | Bodde et al. | |
| 4,399,496 A | 8/1983 | Lengacher | |
| 4,422,131 A | 12/1983 | Clanton et al. | |
| 4,441,142 A | 4/1984 | Garofalo et al. | |
| 4,504,890 A | 3/1985 | Chan et al. | |
| 4,580,198 A | 4/1986 | Zinnanti, Jr. | |
| 4,636,596 A | 1/1987 | Takada | |
| 4,823,242 A | 4/1989 | Maglica et al. | |
| 4,864,474 A | 9/1989 | Maglica | |
| 4,905,130 A | 2/1990 | Huang et al. | |
| 4,907,141 A | 3/1990 | Wang et al. | |
| 4,916,588 A | 4/1990 | Chu et al. | |
| 5,309,337 A | 5/1994 | Groben et al. | |
| 5,473,521 A | 12/1995 | Minshall | |
| 5,475,575 A | 12/1995 | Chin-Hsiang et al. | |
| 5,590,951 A | 1/1997 | Matthews | |
| 5,629,105 A | 5/1997 | Matthews | |
| 5,634,815 A | 6/1997 | Inazuka et al. | |
| 5,669,706 A | 9/1997 | Chen et al. | |
| 6,220,720 B1 | 4/2001 | Stephens et al. | |
| 6,347,878 B1 | 2/2002 | Shiao et al. | |
| 6,511,202 B1 | 1/2003 | Henry et al. | |
| RE38,014 E | 3/2003 | Bieberstein | |
| 6,695,459 B2 | 2/2004 | Collins et al. | |
| 6,908,209 B2 | 6/2005 | Miller et al. | |
| 7,258,582 B2 | 8/2007 | Maglica et al. | |
| 8,096,674 B2 * | 1/2012 | Matthews | F21L 4/005 362/206 |
| 8,833,963 B2 * | 9/2014 | Opolka | F21V 23/0414 362/202 |
| 2002/0100204 A1 | 7/2002 | Kim et al. | |
| 2006/0250790 A1 | 11/2006 | Mah et al. | |
| 2007/0253195 A1 | 11/2007 | Dietz et al. | |
| 2010/0176750 A1 | 7/2010 | West et al. | |

FOREIGN PATENT DOCUMENTS

| | | |
|---|---|---|
| EP | 779472 A1 | 6/1997 |
| FR | 2372382 | 6/1978 |
| WO | 2011028212 | 3/2011 |
| WO | 2015089219 | 6/2015 |

OTHER PUBLICATIONS

Marcotte, "Klarus ST10 (1xAA, XPG R5) Review", Available online at: http://www.flashlightreviews.ca/ST10.htm, Dec. 10, 2010.
PCT/US2014/069599, "International Preliminary Report on Patentability", dated Jun. 23, 2016, 8 pages.
PCT/US2014/069599, "International Search Report and Written Opinion", dated Mar. 27, 2015, 12 pages.
Walmart, "Bushnell Pro High Performance Flashlight, 325 Lumens", walmart.com, Item #: 553507555 Available online at: https://web.archive.org/web/20150324063444/http://www.walmart.com/ip/Generic20154BushnellProHighPerformanceFlashlight325Lumens/42424425, Mar. 24, 2015.

* cited by examiner

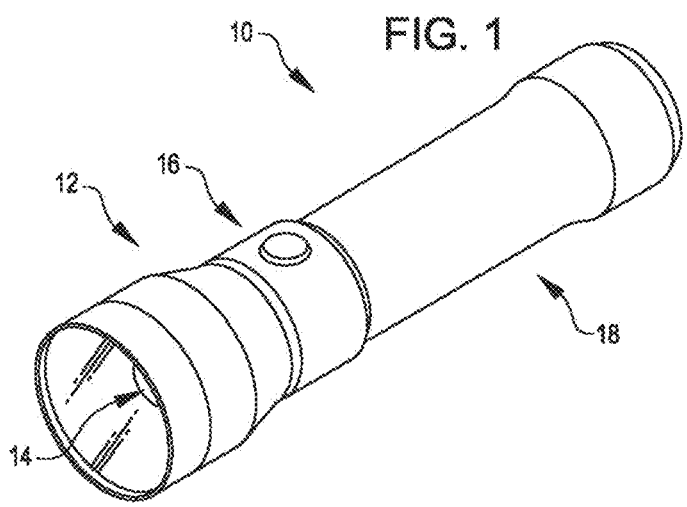
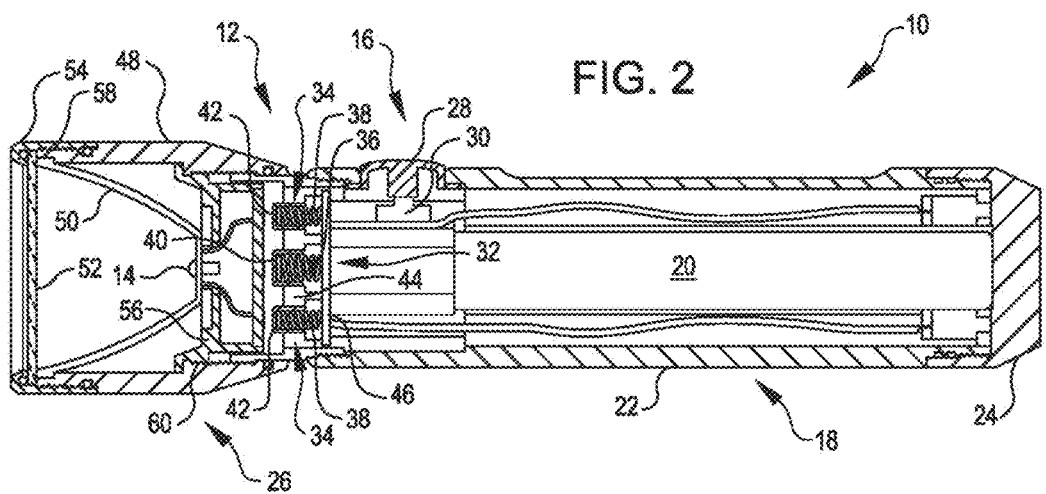

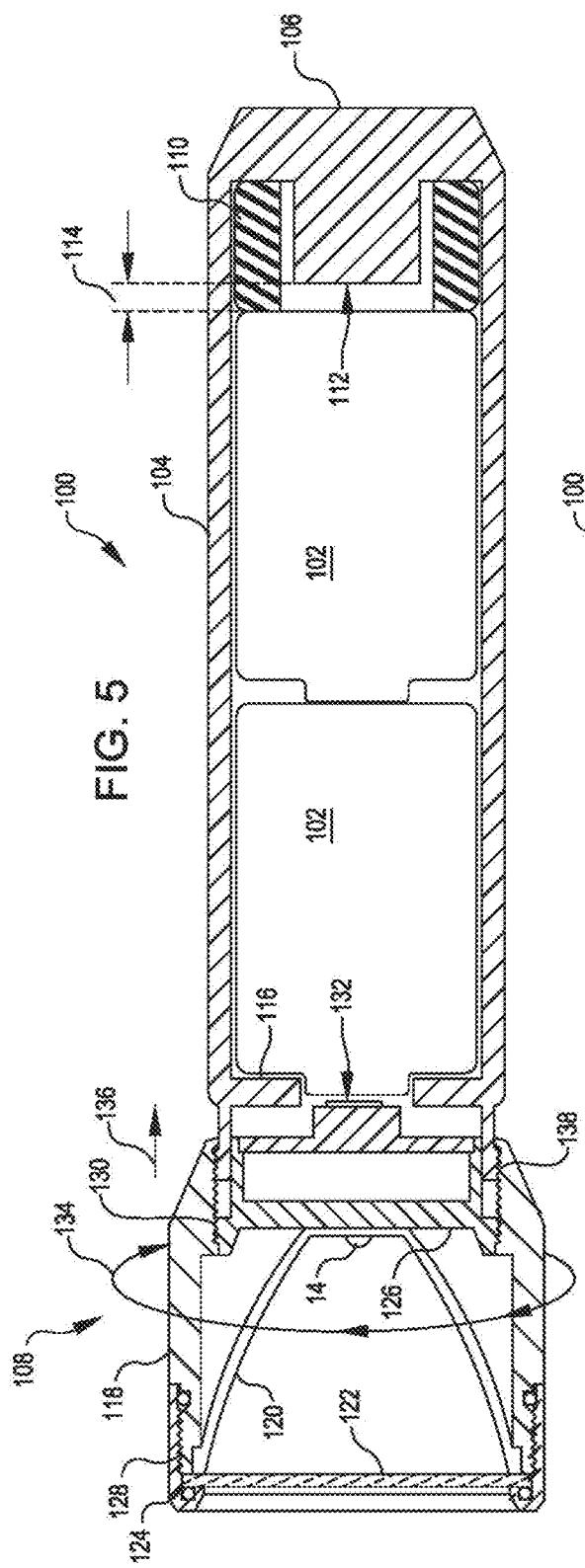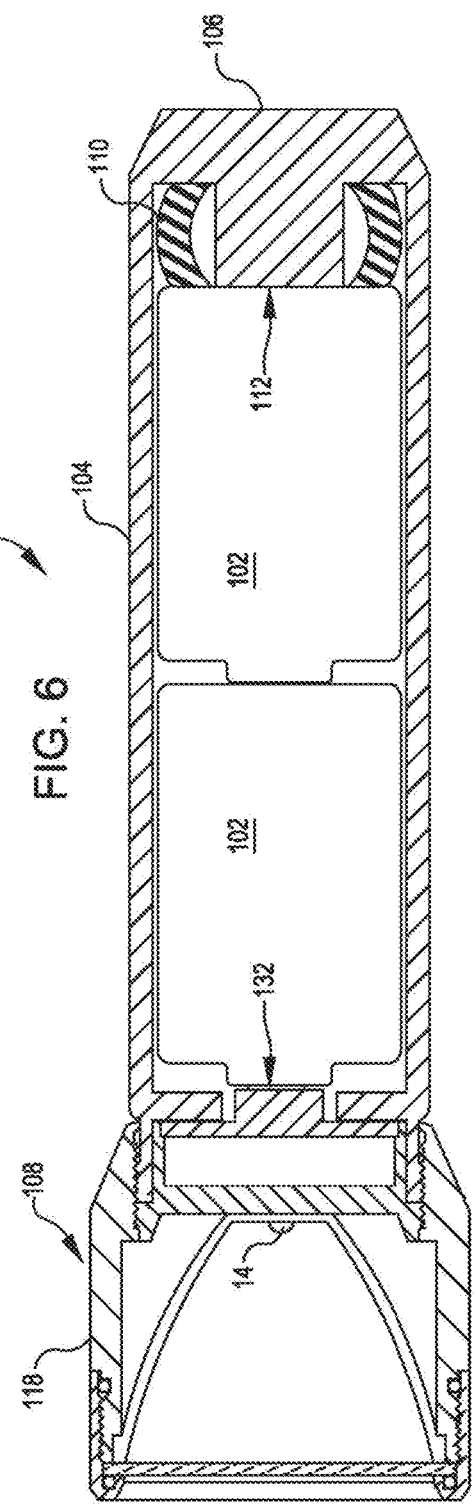

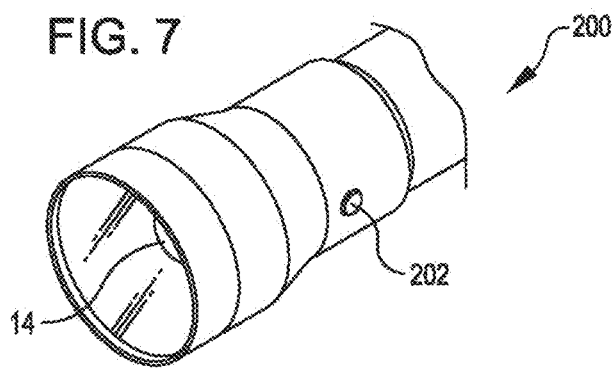
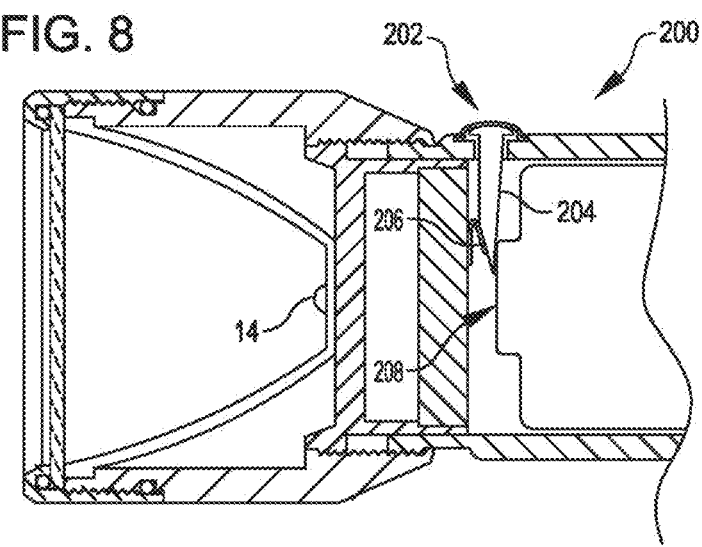
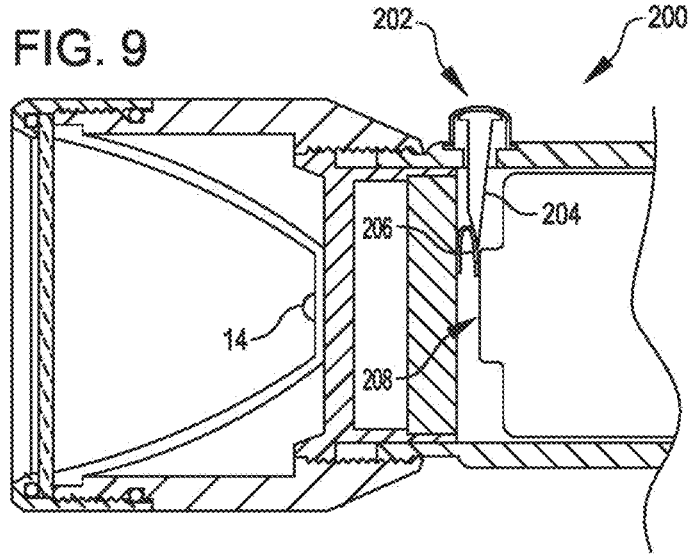

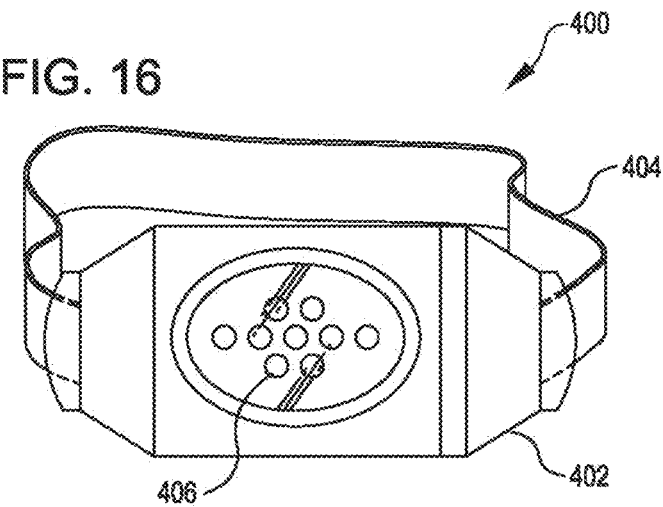
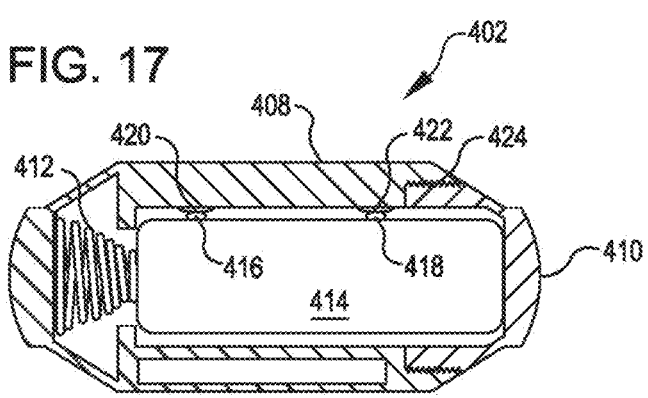
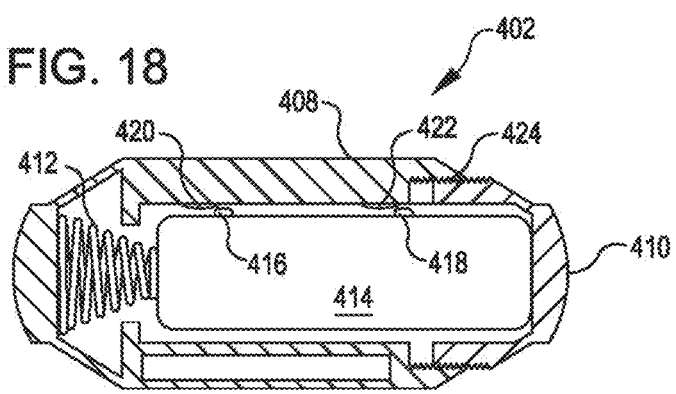

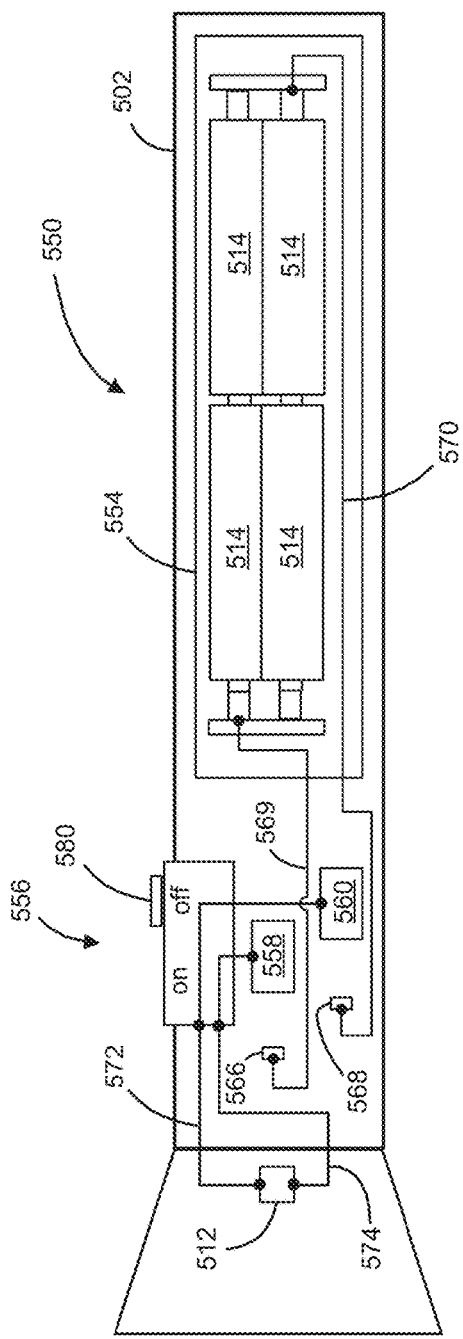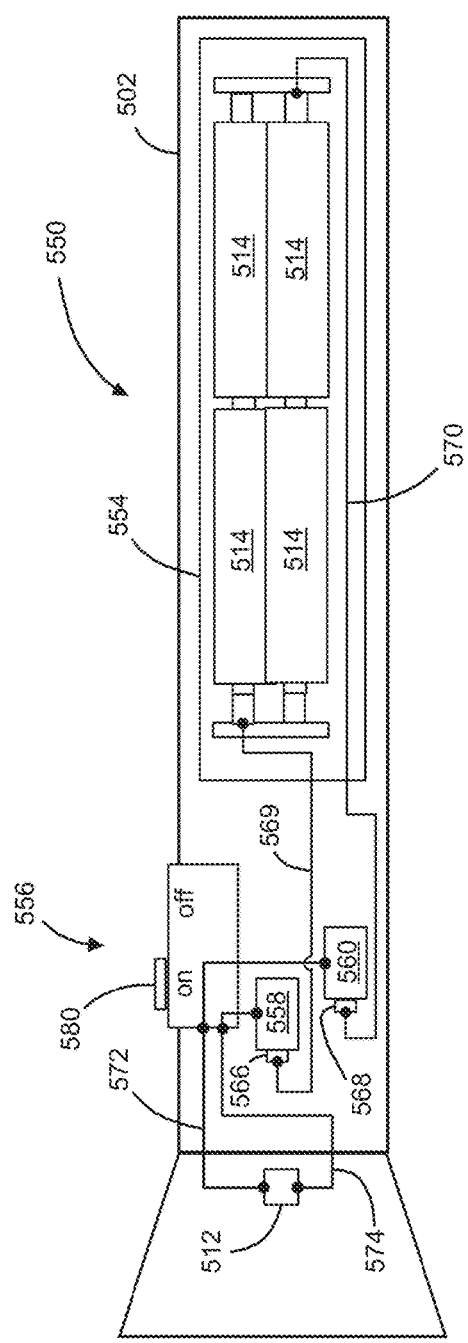

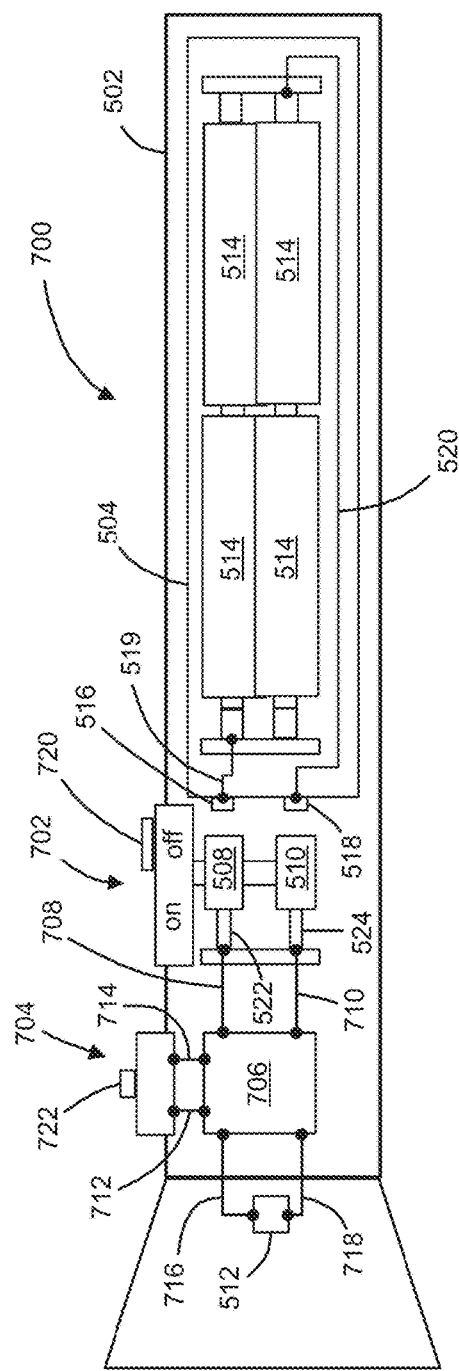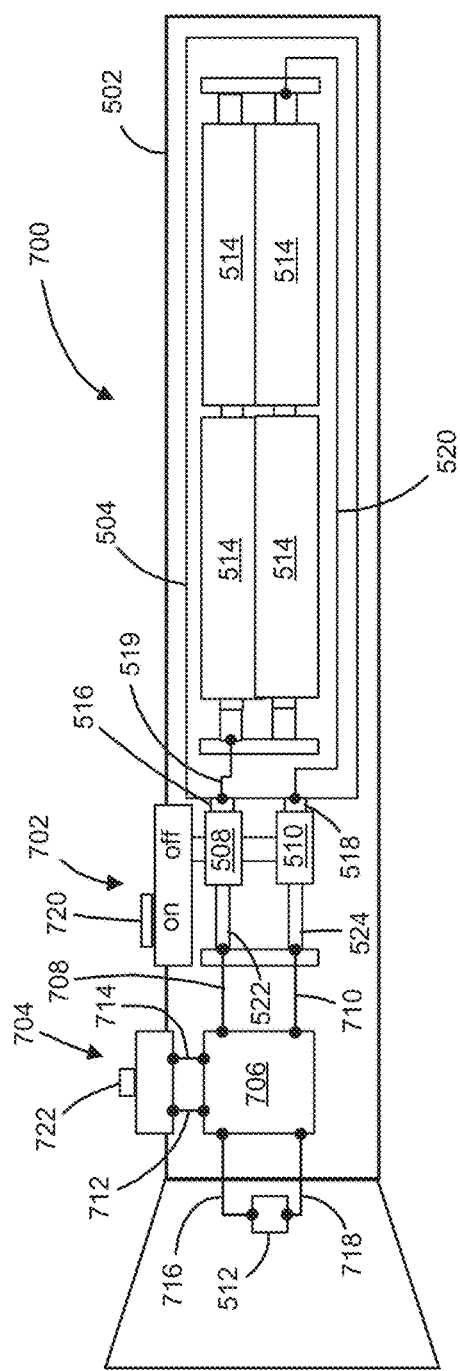

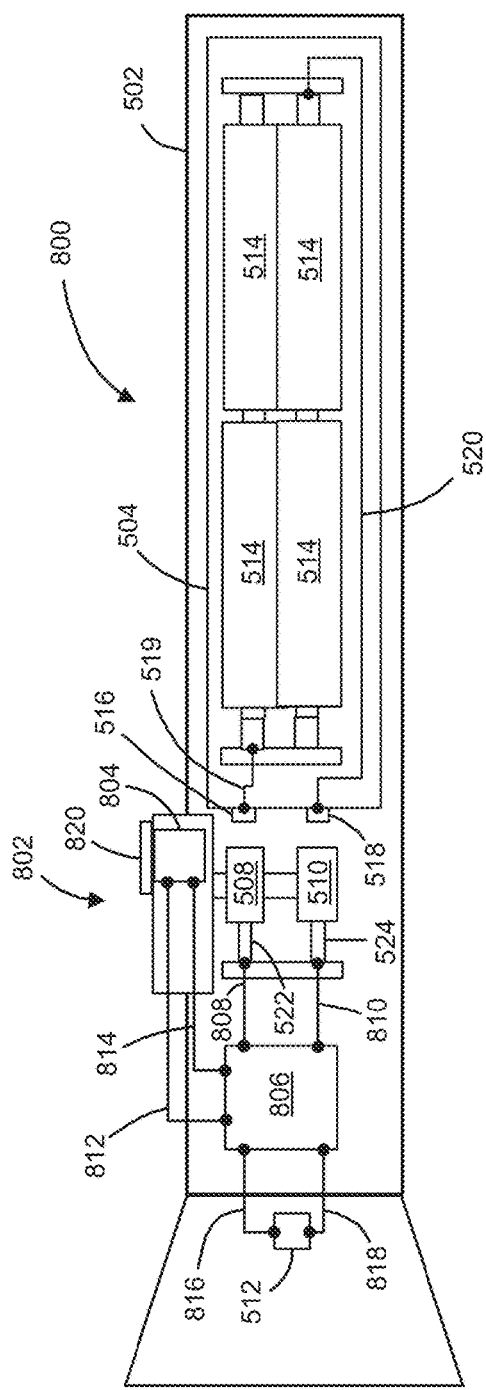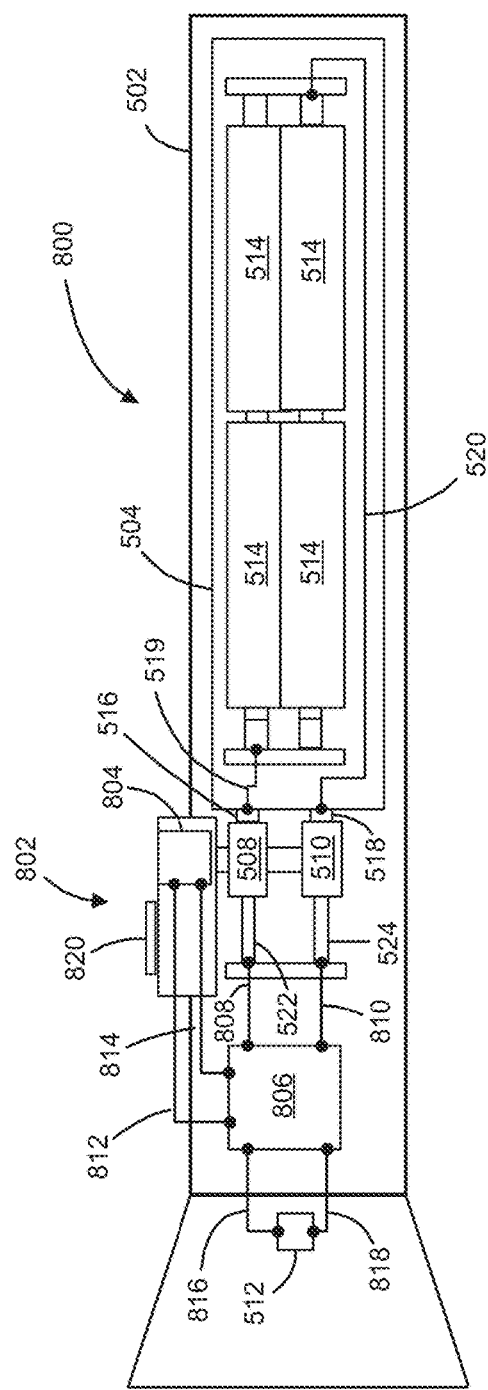

BATTERY LIFE EXTENDER FOR PORTABLE LIGHTING

CROSS-REFERENCES TO RELATED APPLICATIONS

This application is a Continuation-in-Part of International Application No. PCT/US2014/069599, filed Dec. 10, 2014, which application claims the benefit of U.S. Provisional Application No. 61/915,072, filed on Dec. 12, 2013, and also claims the benefit of U.S. Provisional Application No. 61/970,062, filed Mar. 25, 2014, the full disclosures of which are incorporated herein by reference.

BACKGROUND

Portable electrically powered devices such as flashlights are typically battery powered. In many instances, an extended period of time may pass between usages of a battery powered device. Many battery powered devices, however, may consume battery power at a low, even parasitic rate, even when not being used. For example, a flashlight may include an electronic switch that consumes battery power at a parasitic rate even when the flashlight is not being used. Although such a low rate of consumption of battery power may not significantly discharge the batteries of a portable device over a short period of time, such a parasitic power drain over an extended period of time may discharge the batteries enough to leave inadequate battery power to operate the portable device.

BRIEF SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

Approaches and devices for extending the life of batteries used to power portable devices are provided. In many embodiments, a mechanism is provided that is selectively reconfigurable between a first configuration in which a power supply circuit of a portable device is not interrupted and a second configuration in which the power supply circuit of the portable device is interrupted so as to prevent discharge of at least one battery used to power the portable device. The mechanism can be reconfigured by a user of the portable device based upon whether the portable device may not be used for an extended period of time, or whether the portable device is going to be used. For example, the mechanism can be reconfigured from the first configuration to the second configuration when the portable device may not be used for an extended period of time. And the mechanism can be reconfigured from the second configuration to the first configuration prior to use of the portable device. By having the mechanism in the second configuration when the portable device may not be used for an extended period of time, discharge of the at least one battery of the portable device during the extended period of time can be avoided.

In embodiments described herein, the portable battery powered devices are flashlights. It should be understood, however, that the approaches and mechanisms described herein can be applied to other types of portable battery powered devices. For example, the approaches and mechanisms described herein can be applied to other lighting devices (e.g., headlamps, lanterns, spotlights, etc.). Moreover, the approaches and mechanisms described herein can be applied to suitable battery powered devices (e.g., any suitable fan, pump, radio, speaker, tool, etc.).

Thus, in one aspect, a lighting device is disclosed that includes a mechanism that is selectively reconfigurable to prevent discharge of battery power. The lighting device includes a light generating element, at least one battery, a user operated switch, and a housing assembly. The user operated switch is configured to control delivery of electrical power from the at least one battery to the light generating element. The housing assembly supports the at least one battery and the light generating element. The housing assembly is reconfigurable to: (a) a first configuration in which the user operated switch is electrically connected to the at least one battery, and (b) a second configuration in which the at least one battery is electrically isolated and the at least one battery is retained by the housing assembly. In many embodiments, the user operated switch includes an electronic switch that consumes power when the housing assembly is in the first configuration.

In many embodiments of the lighting device, the housing assembly includes a first housing component and a second housing component coupled with the first component in each of the first and second configurations. The second housing component is repositionable relative to the first housing component to allow selective reconfiguration of the housing assembly to each of the first and second configurations. For example, repositioning the second housing component relative to the first housing component to reconfigure the housing assembly to each of the first and second configurations can include rotating and/or translating the second housing component relative to the first housing component.

The reconfiguration of the housing from the second configuration to the first configuration can result in relative translation between the first and second housing components so as to electrically connect the user operated switch with the at least one battery such that the user operated switch is electrically connected with each of a positive terminal of the at least one battery and a negative terminal of the at least one battery. The relative translation between the first and second housing components can result in at least one of: (a) a housing positive electrical contact electrically connected to the user operated switch is placed into electrical connection with the positive terminal of the at least one battery; and (b) a housing negative electrical contact electrically connected to the user operated switch is placed into electrical connection with the negative terminal of the at least one battery. The relative translation between the first and second housing components can result in translation of the at least one battery relative to the each of the first and second housing components.

The lighting device can include a deformable assembly that is used to interrupt a power supply circuit in the lighting device. For example, the deformable assembly can be configured to: (a) apply a biasing force to position the at least one battery relative to the housing assembly so as to prevent the housing negative electrical contact from being placed into electrical connection with the negative terminal of the at least one battery when the housing assembly is in the second configuration; and (b) deform when the housing assembly is reconfigured from the second configuration to the first configuration so as to permit the housing negative electrical contact being placed into electrical connection with the negative terminal of the at least one battery. As another example, the deformable subassembly can be configured to: (a) apply a biasing force to position the at least one battery relative to the housing assembly so as to prevent the housing positive electrical contact from being placed into electrical connection with the positive terminal of the at least one battery when the housing assembly is in the second configuration; and (b) deform when the housing assembly is reconfigured from the second configuration to the first configuration so as to permit the housing positive electrical contact being placed into electrical connection with the positive terminal of the at least one battery.

The lighting device can include a battery cartridge supporting the at least one battery. The battery cartridge can include a cartridge positive contact in electrical connection with the positive terminal of the at least one battery and a cartridge negative contact in electrical connection with the negative terminal of the at least one battery. The relative translation between the first and second housing components can result in the housing positive contact being brought into contact with the cartridge positive contact and the housing negative contact being brought into contact with the cartridge negative contact. Each of the cartridge positive and negative contacts can be disposed on a side of the battery cartridge that is substantially parallel to the relative translation between the first and second housing components. The lighting device can include both the battery cartridge and the deformable assembly. Each of the cartridge positive and negative contacts can include a spring loaded assembly that accommodates a range of relative positions between the first and second housing components while maintaining electrical connection between the at least one battery and the user operated switch.

In many embodiments of the lighting device, the housing assembly is configured such that the second housing component is rotatable relative to the first housing component about a rotational axis. The housing assembly can include at least one housing electrical contact electrically connected with the user operated switch and radially offset from the rotational axis. The at least one housing electrical contact can be electrically isolated from the at least one battery when the housing assembly is in the second configuration. The at least one housing electrical contact can be electrically connected with the at least one battery when the housing assembly is in the first configuration.

In many embodiments of the lighting device, a visual indication is provided that indicates the isolation status of the at least one battery. For example, the lighting device can include an indicator that is viewable by a user when the housing assembly is in the second configuration.

In another aspect, a battery powered portable device includes a battery powered portion, at least one battery, and electronic switch, a first housing portion, and a second housing portion. The electronic switch is configured to control delivery of electrical power from the at least one battery to the battery powered portion. The electronic switch consumes power when electrically connected with the at least one battery. The first housing portion is configured to at least partially house the at least one battery. The second housing portion is coupled with the first housing portion via a threaded connection. The second housing portion includes an electrical connection assembly that forms part of an electrical connection between the at least one battery and the electronic switch when the second housing portion is in a first position relative to the first housing portion and forms a break in the electrical connection when the second housing portion is in a second position relative to the first housing portion. The second housing portion is closer to the first housing portion when in the second position relative to when in the first position.

In many embodiments, the electrical connection assembly includes a first electrical contact electrically connected to the electronic switch, a second electrical contact electrically connected to the at least one battery, and a deformable element. The deformable element biases the second electrical contact into contact with the first electrical contact when the second housing portion is in the first position relative to the first housing portion. The deformable element deforms in response to repositioning of the second housing portion into the second position so as to accommodate separation between the first and second electrical contacts.

The electrical connection assembly can further include a conductive spring connected to the second electrical contact. The spring can contact the at least one battery in each of the first and second positions of the second housing portion relative to the first housing portion.

In many embodiments, the deformable element includes a deformable material layer having a first side and a second side opposite to the first side. The first side can contact the second electrical contact. The second side can contact an end wall of the second housing portion.

In another aspect, a battery powered portable device includes a battery powered portion, at least one battery, an electronic switch, and a user operated mechanical switch. The electronic switch is configured to control delivery of electrical power from the at least one battery to the battery powered portion. The electronic switch consumes power when electrically connected with the at least one battery. The user operated mechanical switch is operable to selectively electrically connect the at least one battery to the electronic switch and to electrically isolate the at least one battery from the electronic switch.

In another aspect, a lighting device includes a housing configured to accommodate a battery assembly that includes one or more batteries, a light generating element supported by the housing, and a first switching mechanism including an articulable positive contact and an articulable negative contact. The first switching mechanism is configurable by a user to: (a) a first configuration in which the positive contact contacts a positive terminal of the battery assembly, the negative contact contacts a negative terminal of the battery assembly, and the light generating element is electrically coupled with the articulable positive contact and the articulable negative contact to receive electric power from the battery assembly to generate light; and (b) a second configuration in which the positive contact is separated from the positive terminal and the negative contact is separated from the negative terminal to electrically isolate the battery assembly.

In many embodiments, the lighting device further includes a control unit operatively coupled with the light generating element. The control unit can be configured to control supply of electrical power to the light generating element to operate the light generating element in a first operational mode when the first switching mechanism is in the first configuration. In many embodiments, the first switching mechanism is configurable by the user to a third configuration in which the articulable positive contact contacts the positive terminal of the battery assembly, the articulable negative contact contacts the negative terminal of the battery assembly, and the light generating element is electrically coupled with the articulable positive contact and the articulable negative contact to receive electric power from the battery assembly to generate light. The control unit can be configured to control supply of electrical power to the light generating element to operate the light generating element in a second operational mode when the first switching mechanism is in the third configuration. The second operational mode is different than the first operational mode.

In many embodiments, the lighting device further includes a second switching and a control unit. The second switching mechanism can be configured to be operable by the user to select an operational mode of the light generating element when the first switching mechanism is in the first configuration. In many embodiments, the control unit is operatively coupled with the light generating element and configured to control supply of electrical power to the light generating element to operate the light generating element in an operational mode selected by the user via the second switching mechanism. The second switching mechanism can have any suitable configuration. For example, the second switching mechanism can include a selection member that is rotatable relative to the housing by the user to select the operational mode. As another example, the second switching mechanism can include a mode selection button operatively coupled with the control unit and operable by the user to cycle through a plurality of operational modes for the light generating element. The first switching mechanism can be configured to block operation of the mode selection button by the user when in the second configuration and accommodate operation of the mode selection button by the user when in the first configuration.

In many embodiments of the lighting device, the battery assembly includes a battery cartridge configured to accommodate a plurality of batteries. In many embodiments, the battery cartridge includes the positive terminal of the battery assembly, a positive voltage path configured to electrically connect the positive terminal of the battery assembly with a positive terminal of the plurality of batteries, the negative terminal of the battery assembly, and a negative voltage path configured to electrically connect the negative terminal of the battery assembly with a negative terminal of the plurality of batteries. The battery cartridge can be configured to accommodate the plurality of batteries in a serially-connected configuration to generate a resulting voltage used to operate the light generating element. The positive terminal of the battery assembly and the negative terminal of the battery assembly can be disposed at any suitable respective location(s) on the battery cartridge. For example, in many embodiments, the positive terminal of the battery assembly and the negative terminal of the battery assembly are disposed at one end of the battery cartridge.

In another aspect, a method is provided for electrically isolating a battery assembly of a lighting device to inhibit parasitic drain of the battery assembly. The method includes maintaining contact between an articulable positive contact and a positive terminal of the battery assembly while a first user-operable switching mechanism of the lighting device is in a first configuration. The first user-operable switching mechanism is drivingly coupled with the articulable positive contact. The articulable positive contact is electrically connected with a light generating element of the lighting device. The method further includes maintaining contact between an articulable negative contact and a negative terminal of the battery assembly while the first user-operable switching mechanism is in the first configuration. The first user-operable switching mechanism is drivingly coupled with the articulable negative contact. The articulable negative contact is electrically connected with a light generating element of the lighting device. The method further includes separating the articulable positive contact from the positive terminal of the battery assembly and the articulable negative contact from the negative terminal of the battery assembly to electrically isolate the battery assembly in response to reconfiguration of the first user-operable switching mechanism from the first configuration to a second configuration.

In many embodiments, the method further includes controlling, via a control unit included in the lighting device, supply of electrical power to the light generating element to operate the light generating element in a first operational mode when the first user-operable switching mechanism is in the first configuration. The method can include controlling, via the control unit, supply of electrical power to the light generating element to operate the light generating element in a second operational mode when the first user-operable switching mechanism is in a third configuration in which the articulable positive contact contacts a positive terminal of the battery assembly and the articulable negative contact contacts a negative terminal of the battery assembly, the second operational mode being different from the first operational mode.

In many embodiments, the method further includes controlling, via a control unit operatively coupled with a second user-operable switching mechanism, supply of electrical power to the light generating element to operate the light generating element in an operational mode selected via the second user-operable switching mechanism. The method can further include outputting a signal from the second user-operable switching mechanism to the control unit corresponding to a rotational orientation of a selection member of the second user-operable switching mechanism. In many embodiments, the outputted signal is indicative of the selected operational mode.

The second user-operable switching mechanism can include a mode selection button. The method can further include outputting a signal from the mode selection button to the control unit corresponding to a selected operational mode for operating the light generating element. The mode selection button can be configured to be operable to cycle through a plurality of operational modes for the light generating element. The method can include blocking operational access to the mode selection button when the first user-operable switching mechanism is in the second configuration and accommodating operational access to the mode selection button when the first user-operable switching mechanism is in the first configuration.

The method can further include accommodating a battery cartridge within the lighting device. The battery cartridge can be configured to accommodate a plurality of batteries and include the positive terminal of the battery assembly and the negative terminal of the battery assembly. The method can include electrically coupling the positive terminal of the battery assembly with a positive terminal of the plurality of batteries and electrically coupling the negative terminal of the battery assembly with a negative terminal of the plurality of batteries. The battery cartridge housing can be configured to accommodate the plurality of batteries in a serially-connected configuration to generate a resulting voltage used to operate the light generating element. The method can include supporting the positive terminal of the battery assembly and the negative terminal of the battery assembly at any suitable location on the battery cartridge. For example, the method can include supporting the positive terminal of the battery assembly and the negative terminal of the battery assembly at one end of the battery cartridge.

For a fuller understanding of the nature and advantages of the present invention, reference should be made to the ensuing detailed description and accompanying drawings.

BRIEF DESCRIPTION OF THE DRAWINGS

FIG. 1 shows a flashlight including a battery life extending mechanism, in accordance with many embodiments.

FIG. 2 shows a cross-sectional view of the flashlight of FIG. 1 in a configuration in which batteries of the flashlight are electrically isolated.

FIG. 5 shows a cross-sectional view of a flashlight, in accordance with many embodiments, in a configuration in which both positive and negative terminals of a battery stack are electrically isolated.

FIG. 6 shows a cross-sectional view of the flashlight of FIG. 5 in a configuration in which both positive and negative terminals of the battery stack are electrically connected for delivery of electrical power.

FIG. 7 partially illustrates a flashlight that includes a user operated mechanism operable to selectively connect and disconnect one or more batteries of the flashlight, in accordance with many embodiments.

FIG. 8 shows a partial cross-sectional view of the flashlight of FIG. 7 in a configuration in which a non-conducting member of the user operated mechanism separates an electrical contact from a battery terminal.

FIG. 9 shows a partial cross-sectional view of the flashlight of FIG. 7 in a configuration in which the non-conducting member of the user operated mechanism does not separate the electrical contact from the battery terminal.

FIG. 16 shows a user worn headlamp including a battery life extending mechanism, in accordance with many embodiments.

FIG. 17 shows a cross-sectional view of the headlamp of FIG. 16 in a configuration in which a battery cartridge of the flashlight is electrically connected for delivery of electrical power to operate the headlamp.

FIG. 18 shows a cross-sectional view of the headlamp of FIG. 16 in a configuration in which the battery cartridge of the headlamp are electrically isolated.

FIG. 21 and FIG. 22 show simplified cross-sectional schematic illustrations of a flashlight that includes a user-operated switching mechanism operable to electrically isolate a battery cartridge when the flashlight is off, in accordance with many embodiments.

FIG. 28 and FIG. 29 show simplified cross-sectional schematic illustrations of a flashlight that includes a first user-operated switching mechanism operable to electrically isolate a battery cartridge when the flashlight is off and a second user-operable switching mechanism operable to select an operational mode for the flashlight when the flashlight is on, in accordance with many embodiments.

FIG. 31 and FIG. 32 show simplified cross-sectional schematic illustrations of a flashlight that includes a user-operated switching mechanism operable to electrically isolate a battery cartridge when the flashlight is off and a mode-selection button operable to select an operational mode for the flashlight when the flashlight is on, in accordance with many embodiments.

DETAILED DESCRIPTION

Figure 3:
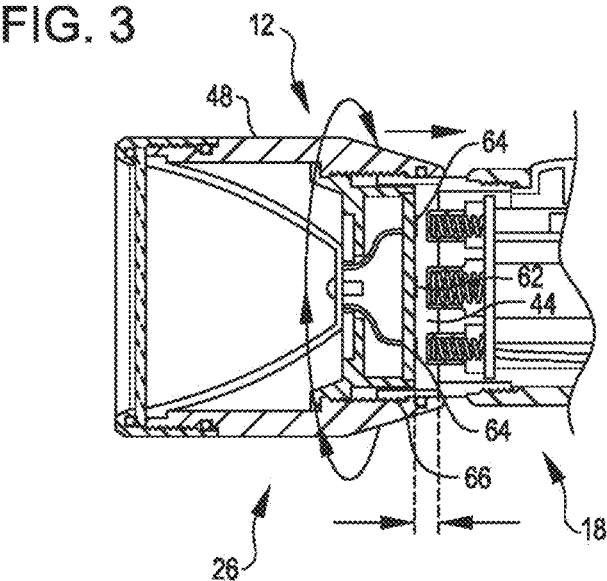
FIG. 3 shows a cross-sectional view of the flashlight of FIG. 1 in a configuration in which batteries of the flashlight are electrically isolated.

In the following description, various embodiments of the present invention will be described. For purposes of explanation, specific configurations and details are set forth in order to provide a thorough understanding of the embodiments. It will also be apparent to one skilled in the art, however, that the present invention may be practiced without the specific details. Furthermore, well-known features may be omitted or simplified in order not to obscure the embodiment being described.

Referring now to the drawings, in which like reference numerals represent like parts throughout the several views, FIG. 1 shows a flashlight 10 that includes a battery life extending mechanism 12, in accordance with many embodiments. The flashlight 10 includes a light generating element 14, a user operated switch 16, and a housing assembly 18. The housing assembly 18 has an internal volume that accommodates a battery assembly including one or more batteries used to power the flashlight 10. In many embodiments, the user operated switch 16 includes an electronic switch that consumes battery power when the user operated switch 16 is operatively connected to the one or more batteries. To enable selective electrical isolation of the one or more batteries so as prevent discharge of the one or more batteries via the electronic switch, the battery life extending mechanism 12 is user reconfigurable such that the user can selectively electrically connect the one or more batteries with the user operated switch 16 and electrically isolate the one or more batteries from the user operated switch 16.

FIG. 2 shows a cross-sectional view of the flashlight 10 in a configuration in which the battery assembly 20 of the flashlight 10 is electrically isolated from the user operated switch 16. FIG. 2 also illustrates additional components of the flashlight 10. For example, the housing assembly 18 includes a main body 22, an end cap 24, a head assembly 26, and the battery life extending mechanism 12. The user operated switch 16 includes a push button 28 and a tactile switch 30 that is selectively operated by user depression of the push button 28. In many embodiments, the tactile switch 30 includes electronic components that may consume a small amount of power from the one or more batteries of the battery assembly 20 when the tactile switch 30 is electrically connected to the one or more batteries of the battery assembly 20.

The battery assembly 20 further includes spring loaded contact assemblies 32, 34. In the illustrated embodiment, the spring loaded contact assembly 32 is connected with to one polarity of the one or more batteries (e.g., positive or negative) and the spring loaded contact assemblies 34 are connected to the other polarity (e.g., negative or positive). While the illustrated embodiment of the battery assembly 20 includes two of the spring loaded contact assemblies 34, a single spring loaded contact assembly 34 can be used. Each of the spring loaded assemblies 32, 34 includes a conductive spring 36, 38 and a contact member 40, 42. Each of the contact members 40, 42 partially accommodates a respective one of the spring 36, 38. The battery assembly 20 further includes a frame member 44 that interfaces with and accommodates each of the contact members 40, 42. Each of the contact members 40, 42 is configured to extend past an end face of the frame member 44 by a fixed amount when the flashlight 10 is in the configuration illustrated in FIG. 2. For example, each of the contact members 40, 42 can have a feature that interfaces with the frame member 44 so as to limit the amount that the contact member 40, 42 extends past the frame member 44 under the biasing force supplied by compressive deformation of the respective spring 36, 38.

The battery assembly 20 further includes a base contact assembly 46. The base contact assembly 46 interfaces with each of the conductive springs 36, 38 and electrically connects the conductive springs 36, 38 to respective polarities of the one or more batteries of the battery assembly 20. When the battery assembly 20 includes two or more batteries, the batteries can be electrically connected in any suitable fashion such as in series, in parallel, or in both series and parallel (e.g., two sets of two series connected batteries with the two sets being connected in parallel).

The head assembly 26 includes, the light generating element 14, an external housing member 48, a reflector 50, a lens 52, a lens cap 54, and an internal frame assembly 56. The reflector 50 and the lens 52 are supported by the external housing member 48 and retained within the external housing member 48 via the lens cap 54, which is removably coupled with the external housing member 48 via a threaded connection 58. The internal frame assembly 56 is coupled to the external housing member 48 via a threaded connection 60 and includes electrical contacts 62, 64 that are electrically coupled with a circuit including the light generating element 14 and the tactile switch 30. The electrical contact 62 is centrally disposed and configured to be selectively be brought into contact with the contact member 40 via selective reconfiguration of the battery life extending mechanism 12. The electrical contact 64 is annular shaped and configured to be selectively brought into contact with the contact members 42 via selective reconfiguration of the battery life extending mechanism 12.

Figure 4:
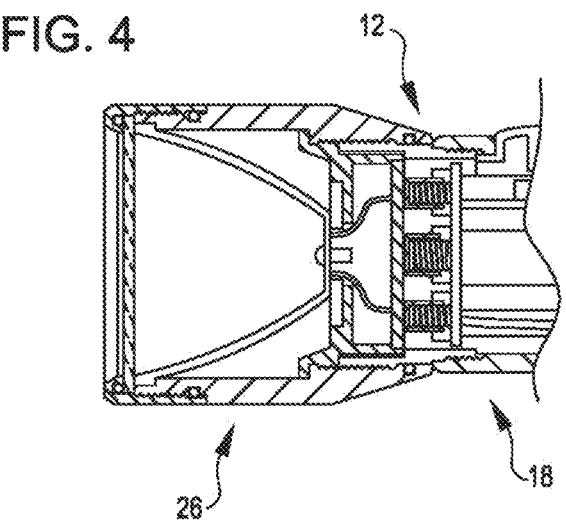
FIG. 4 illustrates the flashlight of FIG. 1 in the configuration in which the batteries of the flashlight are electrically connected for delivery of electrical power to operate the flashlight.

FIG. 3 illustrates relative movement between the head assembly 26 and the housing assembly 18 that is used to reconfigure the battery life extending mechanism 12 between the configuration shown in FIG. 2 and the configuration show in FIG. 4. In the configuration shown in FIG. 2, the one or more batteries of the battery assembly 20 are electrically isolated from the circuit including the light generating element 14 and the tactile switch 30. In the configuration shown in FIG. 4, the one or more batteries of the battery assembly 20 are electrically connected with the circuit including the light generating element 14 and the tactile switch 30. As shown in FIG. 3, the external housing member 48 is coupled with the frame member 44 via a threaded connection 66. By rotating the external housing member 48 relative to the frame member 44, the head assembly 26 can be controllably translated relative to the frame member 44 so as to selectively bring the centrally disposed contact 62 and the annularly shaped contact 64 into contact with or out of contact with the spring loaded contact assemblies 32, 34. Accordingly, the flashlight 10 can be reconfigured between the configuration shown in FIG. 2 and the configuration shown in FIG. 4 via relative rotation of the head assembly 26 relative to the frame member 44, which is rotationally fixed relative to the main body 22.

FIG. 5 shows a cross-sectional view of a flashlight 100, in accordance with many embodiments, in a configuration in which both positive and negative terminals of a stack of batteries 102 are electrically isolated from a circuit including a light emitting element 14 and a user operated switch controlling delivery of power from the stack of batteries 102 to the light emitting element 14. The flashlight 100 includes a main housing 104, an end cap assembly 106, a head assembly 108, and a deformable member 110. The end cap assembly 106 includes an electrical contact 112. The electrical contact 112 is electrically connected to the circuit including the light emitting element 14 and the user operated switch. In the configuration shown in FIG. 5, the deformable member 110 is in an extended configuration that maintains a separation gap 114 between the stack of batteries 102 and the electrical contact 112. In many embodiments, when the flashlight 100 is in the configuration shown in FIG. 5, the deformable member 110 exerts a biasing force on the stack of batteries 102 so as to maintain contact between the stack of batteries 102 and a shoulder feature 116 of the main housing 104.

The head assembly 108 includes an external housing member 118, a reflector 120, a lens 122, a lens cap 124, and an internal frame assembly 126. The reflector 120 and the lens 122 are supported by the external housing member 118 and retained within the external housing member 118 via the lens cap 124, which is removably coupled with the external housing member 118 via a threaded connection 128. The internal frame assembly 126 is coupled to the external housing member 118 via a threaded connection 130 and includes an electrical contact 132 that is electrically coupled with the circuit including the light generating element 14 and the user operated switch.

The head assembly 108 is selectively repositionable relative to the main housing 104. In the illustrated embodiment, a selective rotation 134 of the head assembly 108 relative to the main housing 104 can be accomplished by a user to reposition the head assembly 108 in a direction 136. The selective rotation 134 results in repositioning of the head assembly 108 due to the head assembly 108 being coupled to the main housing 104 via a threaded connection 138. In the configuration illustrated in FIG. 5, the head assembly 108 is positioned relative to the main housing 104 such that a gap exists between the stack of batteries 102 and the electrical contact 132. The head assembly 108 can be coupled with the main housing 104 such that a desired amount of the selective rotation 134, for example, 45 to 180 degrees of rotation, is used to reposition the head assembly 108 from the configuration shown in FIG. 5 to the configuration shown in FIG. 6.

In the configuration illustrated in FIG. 6, the head assembly 108 is positioned relative to the main housing 104 such the electrical contact 132 is in contact with the stack of batteries 102 and the head assembly 108 exerts a biasing force onto the stack of batteries 102 sufficient to compress the deformable member 110 and to maintain contact between the stack of batteries 102 and the electrical contact 112. As can be seen by comparing FIG. 5 and FIG. 6, the head assembly 108 is repositionable so as to displace the stack of batteries 102 relative to the main housing 104 sufficient to compress the deformable member 110 and bring the stack of batteries 102 into contact with the electrical contact 112. In the configuration shown in FIG. 6, the stack of batteries 102 is operatively electrically connected to the circuit including the light emitting element 14 and the user operated switch.

In the flashlight 100, repositioning of the head assembly 108 relative to the main housing 104 along the direction 136 is accomplished via the selective rotation 134 in combination with the threaded connection 138. Alternatively, other suitable approaches for repositioning the head assembly 108 relative to the main housing 104 along the direction 136 can be used. For example, the head assembly 108 can be slideably coupled with the main housing 104 to allow selective translation along the direction 136 between the configurations shown in FIG. 5 and FIG. 6. One or more suitable detent mechanisms can be used to prevent inadvertent relative translation between the head assembly 108 and the main housing 104 so as to selectively maintain each of the configurations shown in FIG. 5 and FIG. 6.

FIG. 7 partially illustrates a flashlight 200 that includes a user operated mechanism 202. The user operable mechanism 202 is user reconfigurable to enable selective interruption of a circuit between one or more batteries of the flashlight 200 and a user operated switch used to control delivery of battery power to a light emitting element 14 of the flashlight 200.

FIG. 8 shows a partial cross-sectional view of the flashlight 200 in a configuration in which a non-conducting member 204 of the user operated mechanism 202 separates an electrical contact 206 from a battery terminal 208 of one or more batteries of the flashlight 200. The user operated mechanism 202 is configured to maintain the illustrated position of the non-conducting member 204 absent user interaction with the mechanism 202. The electrical contact 206 is electrically connected to a circuit including the light emitting element 14 and a user operated switch that controls delivery of battery power to the light emitting element 14.

FIG. 9 shows a partial cross-sectional view of the flashlight 200 in a configuration in which the non-conducting member 204 of the user operated mechanism 202 does not separate the electrical contact 206 from a battery terminal 208 of one or more batteries of the flashlight 200. The user operated mechanism 202 is configured to maintain the illustrated position of the non-conducting member 204 absent user interaction with the mechanism 202.

Alternatively, other approaches can be used to selectively isolate one or more batteries of a flashlight from a circuit including a light emitting element and a user operated switch used to control delivery of battery power to the light emitting element. For example, an additional user operated switch (e.g., a simple on/off single pole, single throw electrical switch) can be incorporated into the circuit including the light emitting element and the user operated switch used to control delivery of battery power to the light emitting element.

Figure 10:
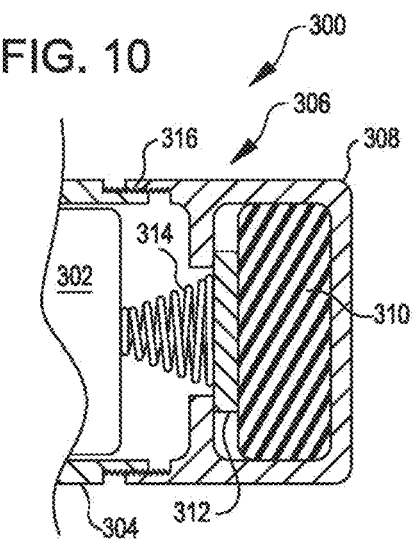
FIG. 10 shows a partial cross-sectional view of a flashlight in a configuration in which a reconfigurable mechanism including a deformable element forms part of an electrical connection for supplying battery power, in accordance with many embodiments.

FIG. 10 shows a partial cross-sectional view of a flashlight 300 that includes a light emitting element, a user operable switch controlling delivery of battery power to the light emitting element, one or more batteries 302, a battery housing 304 and a reconfigurable mechanism 306 coupled with the housing 304. The reconfigurable mechanism 306 is selectively reconfigurable to electrically isolate the one or more batteries 302 from a circuit including the light emitting element and a user operated switch controlling delivery of battery power to the light emitting element. The mechanism 306 includes an end cap frame 308, a deformable member 310, an electrical contact 312, and a conductive spring 314. The end cap frame 308 is coupled with the battery housing 304 via a threaded connection 316.

In the configuration illustrated in FIG. 10, the one or more batteries 302 are electrically connected with the circuit including the light emitting element and the user operated switch controlling delivery of battery power to the light emitting element. The end cap frame 308 is positioned relative to the housing 304 such that a sufficient separation between the one or more batteries 302 and the end cap exits to accommodate a semi-compressed state of the combination of the deformable member 310, the electrical contact 312, and the conductive spring 314 in which the electrical contact 312 is held in contact with an electrical contact 318 supported by the end cap frame 308 via a biasing force exerted on the electrical contact 312 by the deformable member 310. The electrical contact 318 is electrically coupled with the circuit including the light emitting element and the user operated switch controlling delivery of battery power to the light emitting element.

Figure 11:
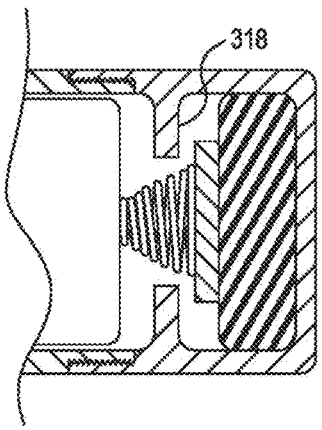
FIG. 11 shows a cross-sectional view of the flashlight of FIG. 10 in a configuration in which the reconfigurable mechanism forms an interruption in the electrical connection for supplying battery power.

In the configuration illustrated in FIG. 11, the one or more batteries 302 are electrically isolated from the circuit including the light emitting element and the user operated switch controlling delivery of battery power to the light emitting element. The end cap frame 308 is positioned relative to the housing 304 such that a separation between the one or more batteries 302 and the end cap exits to accommodate a compressed state of the combination of the deformable member 310, the electrical contact 312, and the conductive spring 314 in which the electrical contact 312 is separated from the electrical contact 318 supported by the end cap frame 308.

In the illustrated embodiment, repositioning the end cap frame 308 relative to the battery housing 304 is accomplished via the threaded connection 316 by rotation of the end cap frame 308 relative to the battery housing 304. Alternatively, other suitable approaches for repositioning the end cap frame 308 relative to the battery housing 304 can be used. For example, the end cap frame 308 can be slideably coupled with the battery housing 304 to allow selective translation between the configurations shown in FIG. 10 and FIG. 11. One or more suitable detent mechanisms can be used to prevent inadvertent relative translation between the end cap frame 308 and the battery housing 304 so as to selectively maintain each of the configurations shown in FIG. 10 and FIG. 11.

Figure 12:
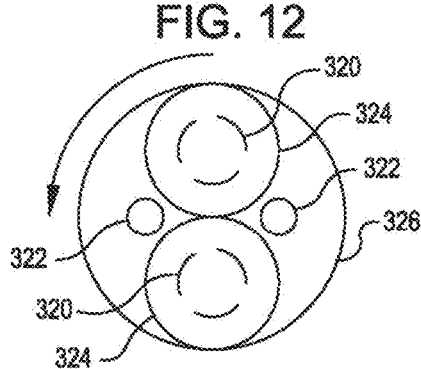
FIG. 12 through FIG. 15 schematically illustrate the use of relative rotation between components of a portable device about an axis of rotation to selectively connect and isolate battery terminals, in accordance with many embodiments.
Figure 13:
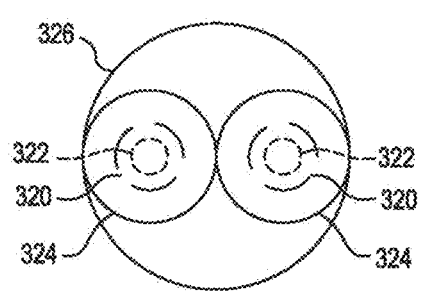
Figure 14:
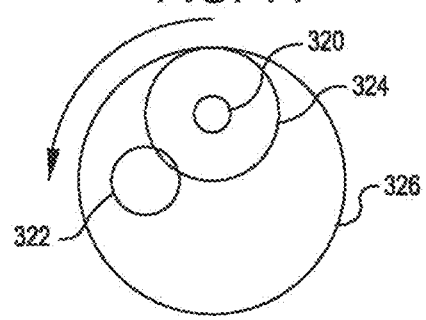
Figure 15:
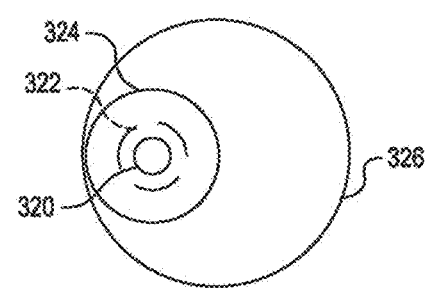

FIG. 12 through FIG. 15 schematically illustrate the use of relative rotation between components of a flashlight to selectively connect and isolate battery terminals, in accordance with many embodiments. FIG. 12 schematically illustrates a configuration in which battery terminals 320 are separated from electrical contacts 322. The electrical contacts 322 are electrically connected to a circuit including a light emitting element and a user operated switch operable to control delivery of battery power to the light emitting element. The batteries 324 of the battery terminals 320 are housed within a battery housing 326. The battery terminals 320 are radially offset from a centerline axis of the battery housing 326. In many embodiments, the batteries 324 are restrained from moving radially relative to the battery housing 326. The electrical contacts 322 are also offset from the centerline axis of the battery housing 326. The electrical contacts 322 are supported so as to be selectively rotatable relative to the battery housing 326 so as to enable selective separation between the battery terminals 320 and the electrical contacts 322 as depicted in FIG. 12 and selective engagement between the battery terminals 320 and the electrical contacts 322 as depicted in FIG. 13. FIG. 14 and FIG. 15 schematically illustrate a similar configuration as illustrated in FIG. 11 and FIG. 12, but with a single battery 324 and terminal 320 and a single electrical contact 322.

FIG. 16 shows a user worn headlamp 400 including a battery life extending mechanism, in accordance with many embodiments. The headlamp 400 includes a main assembly 402 and a headband 404 for holding the main assembly 402 in place on a user, such as holding the main assembly 402 in place on a user's forehead. The main assembly 402 includes one or more light emitting elements 406.

FIG. 17 shows a cross-sectional view of the main assembly 402 in a configuration in which one or more batteries of the headlamp 400 are electrically connected for delivery of electrical power to the one or more light emitting elements 406. The main assembly 402 includes a housing 408, a battery door 410, a spring 412, and a battery cartridge 414. The battery cartridge 414 houses one or more batteries and includes battery cartridge electrical contacts 416, 418. The battery cartridge electrical contacts 416, 418 are electrically connected to respective polarities of the one or more batteries of the battery cartridge 414. The main assembly 402 includes main assembly electrical contacts 420, 422. The main assembly electrical contacts 420, 422 are electrically connected to a circuit that includes the one or more light emitting elements 406 and a user operated switch that controls delivery of battery power from the battery cartridge 414 to the one or more light emitting elements 406. In the configurations shown in FIG. 16 and FIG. 17, the spring 412 exerts a biasing force onto the battery cartridge 414 thereby maintaining contact between the battery cartridge 414 and the battery door 410. The battery door 410 is coupled with the housing 408 via a threaded connection 424. In the configuration illustrated in FIG. 17, the battery door 410 is fully installed into the housing 408 via the threaded connection 424, thereby aligning, and maintaining contact between, the battery cartridge electrical contacts 416, 418 and the main assembly electrical contacts 420, 422. In the configuration illustrated in FIG. 18, the battery door 410 is partially installed into the housing 408 via the threaded connection 424, thereby misaligning, and maintaining separation between, the battery cartridge electrical contacts 416, 418 and the main assembly electrical contacts 420, 422. By partially installing the battery door 410 as illustrated in the configuration illustrated in FIG. 18, parasitic draining of power from the battery cartridge 414 can be prevented during an extended period of time between usages of the headlamp 400.

Figure 19:
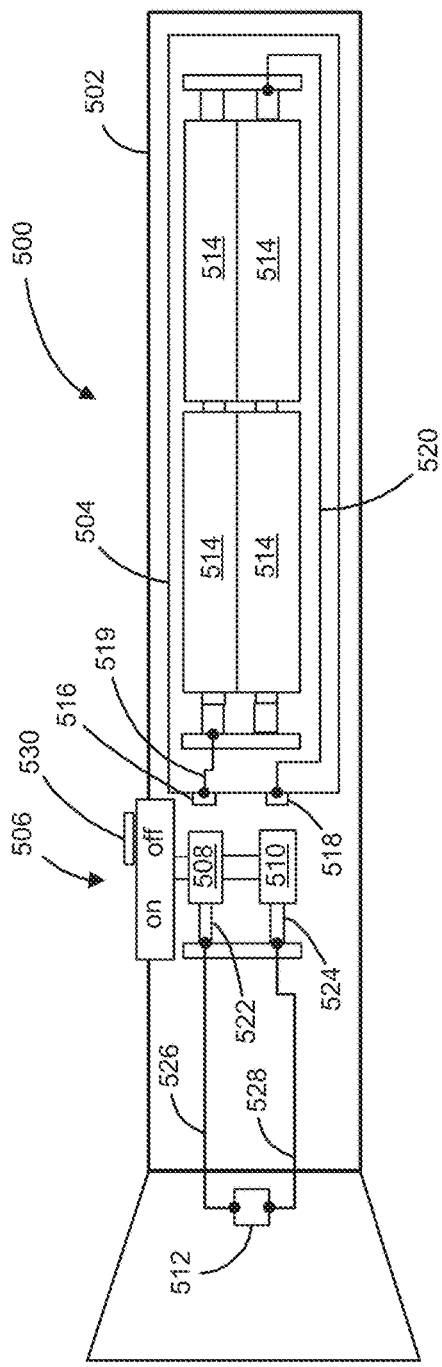
FIG. 19 and FIG. 20 show simplified cross-sectional schematic illustrations of a flashlight that includes a user-operated switching mechanism operable to electrically isolate a battery cartridge when the flashlight is off, in accordance with many embodiments.
Figure 20:
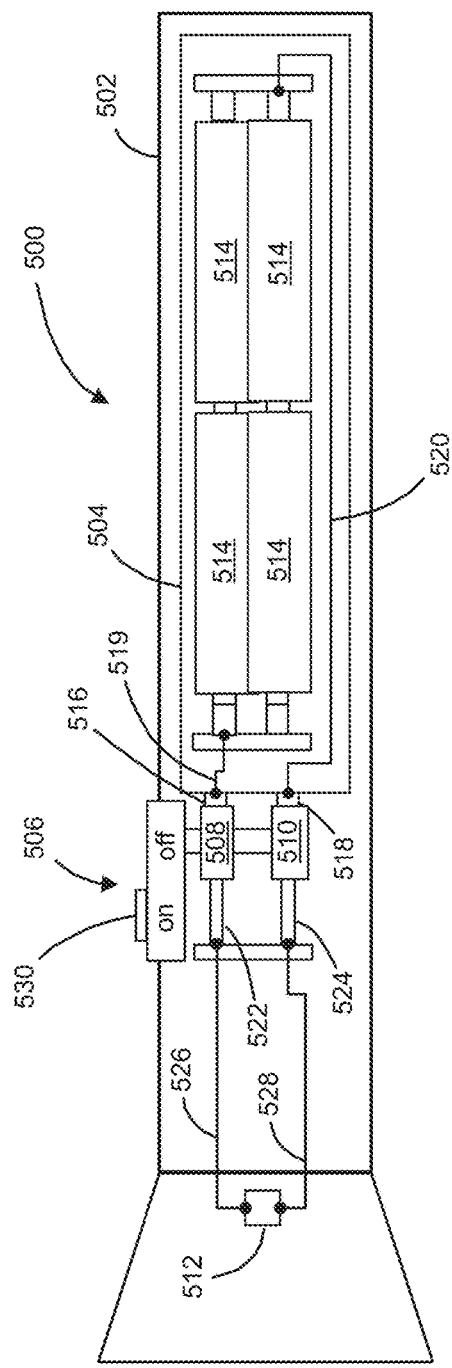

FIG. 19 and FIG. 20 show simplified cross-sectional schematic illustrations of a flashlight 500, in accordance with many embodiments. The flashlight 500 is configured to electrically isolate a battery assembly 504 when the flashlight 500 is off to inhibit parasitic drain of the battery assembly 504. In the illustrated embodiment, the flashlight 500 includes a housing 502, the battery cartridge 504, a user-operated switching mechanism 506, an articulable positive contact 508, an articulable negative contact 510, and a light generating element 512. Any suitable light generating element(s) (e.g., a light emitting diode(s) (LED(s)) can be used as the light generating element 512. The battery cartridge 504 is configured to accommodate a plurality of batteries 514. In the illustrated embodiment, the batteries 514 are serially coupled to generate a resulting voltage that is output from the battery cartridge 504 to operate the flashlight 500. The battery cartridge 504 includes a positive terminal 516 and a negative terminal 518. The battery cartridge 504 includes a positive voltage path 519 that electrically couples the positive terminal 516 with a positive terminal of one of the batteries 514. The battery cartridge includes a negative voltage path 520 that electrically couples the negative terminal 518 with a negative terminal of another of the batteries 514. In the illustrated embodiment, the positive terminal 516 and the negative terminal 518 are disposed at one end of the battery cartridge 504, thereby helping to simplify the configuration of the flashlight 500 with respect to articulation of the articulable positive and negative contacts 508, 510.

The user-operated switching mechanism 506 is drivingly coupled with the articulable positive contact 508 and the articulable negative contact 510 for reconfiguring the flashlight 500 between the "off" configuration illustrated in FIG. 19 and the "on" configuration illustrated in FIG. 20. In the illustrated embodiment, the articulable positive contact 508 is supported via a first conductive spring assembly 522 and the articulable negative contact 510 is supported via a second conductive spring assembly 524. The light generating element 512 is electrically connected with the first conductive spring assembly 522 via a first conductive path 526 and the second conductive spring assembly 524 via a second conductive path 528. In the illustrated embodiment, the user-operated switching mechanism 506 includes a sliding member 530 that can be slid by a user between an off position (off) as shown in FIG. 19 and an on position (on) as shown in FIG. 20. When the sliding member 530 is moved from the on position shown in FIG. 20 to the off position shown in FIG. 19, the user-operating switching mechanism 506 displaces the positive and negative contacts 508, 510 away from the positive and negative terminals 516, 518, thereby separating and electrically disconnecting the positive contact 508 from the positive terminal 516 and the negative contact 510 from the negative terminal 518. In the configuration illustrated in FIG. 19, the battery cartridge 504 is electrically isolated, thereby inhibiting parasitic drain of the batteries 514. When the sliding member 530 is moved from the off position shown in FIG. 19 to the on position shown in FIG. 20, the user-operating switching mechanism 506 reconfigures to accommodate movement of the positive and negative contacts 508, 510 towards the positive and negative terminals 516, 518, thereby allowing the first conductive spring assembly 522 to move the positive contact 508 into contact with the positive terminal 516 and allowing the second conductive spring assembly 524 to move the negative contact 510 into contact with the negative terminal 518. In the configuration illustrated in FIG. 20, the light generating element 512 is electrically coupled with the battery cartridge 504 and powered by electrical current from the batteries 514.

FIG. 21 and FIG. 22 show simplified cross-sectional schematic illustrations of a flashlight 550, in accordance with many embodiments. The flashlight 550 is configured to electrically isolate a battery assembly 554 when the flashlight 550 is off to inhibit parasitic drain of the battery assembly 554. The flashlight 550 is configured similar to the flashlight 500, but does not include the conductive spring assemblies 522, 524. In the illustrated embodiment, the flashlight 550 includes the housing 502, the battery cartridge 554, a user-operated switching mechanism 556, an articulable positive contact 558, an articulable negative contact 560, and the light generating element 512. Any suitable light generating element(s) (e.g., a light emitting diode(s) (LED (s)) can be used as the light generating element 512. The battery cartridge 554 is configured to accommodate a plurality of batteries 514. In the illustrated embodiment, the batteries 514 are serially coupled to generate a resulting voltage that is output from the battery cartridge 554 to operate the flashlight 550. The battery cartridge 554 includes a positive terminal 566 and a negative terminal 568. The battery cartridge 554 includes a positive voltage path 569 that electrically couples the positive terminal 566 with a positive terminal of one of the batteries 514. The battery cartridge includes a negative voltage path 570 that electrically couples the negative terminal 568 with a negative terminal of another of the batteries 514. In the illustrated embodiment, the positive terminal 566 and the negative terminal 568 are disposed at one end of the battery cartridge 554, thereby helping to simplify the configuration of the flashlight 550 with respect to articulation of the articulable positive and negative contacts 558, 560.

The user-operated switching mechanism 556 is drivingly coupled with the articulable positive contact 558 and the articulable negative contact 560 for reconfiguring the flashlight 550 between the "off" configuration illustrated in FIG. 21 and the "on" configuration illustrated in FIG. 22. In the illustrated embodiment, the light generating element 512 is electrically connected with the articulable positive contact 558 via a first conductive path 572 and with the articulable negative contact 560 via a second conductive path 574. In the illustrated embodiment, the user-operated switching mechanism 556 includes a sliding member 580 that can be slid between an off position as shown in FIG. 21 and an on position as shown in FIG. 22. When the sliding member 580 is moved from the off position shown in FIG. 21 to the on position shown in FIG. 22, the user-operating switching mechanism 556 displaces the positive and negative contacts 558, 560 into contact with the positive and negative terminals 566, 568, thereby electrically connecting the light generating element 512 with the battery cartridge 554 to power the light generating element 512 via electrical power output by the battery cartridge 554. When the sliding member 580 is moved from the on position shown in FIG. 22 to the off position shown in FIG. 21, the user-operating switching mechanism 556 displaces the positive and negative contacts 558, 560 away from the positive and negative terminals 566, 568, thereby separating and electrically disconnecting the positive contact 558 from the positive terminal 566 and the negative contact 560 from the negative terminal 568. In the configuration illustrated in FIG. 22, the battery cartridge 554 is electrically isolated, thereby inhibiting parasitic drain of the batteries 514.

Figure 23:
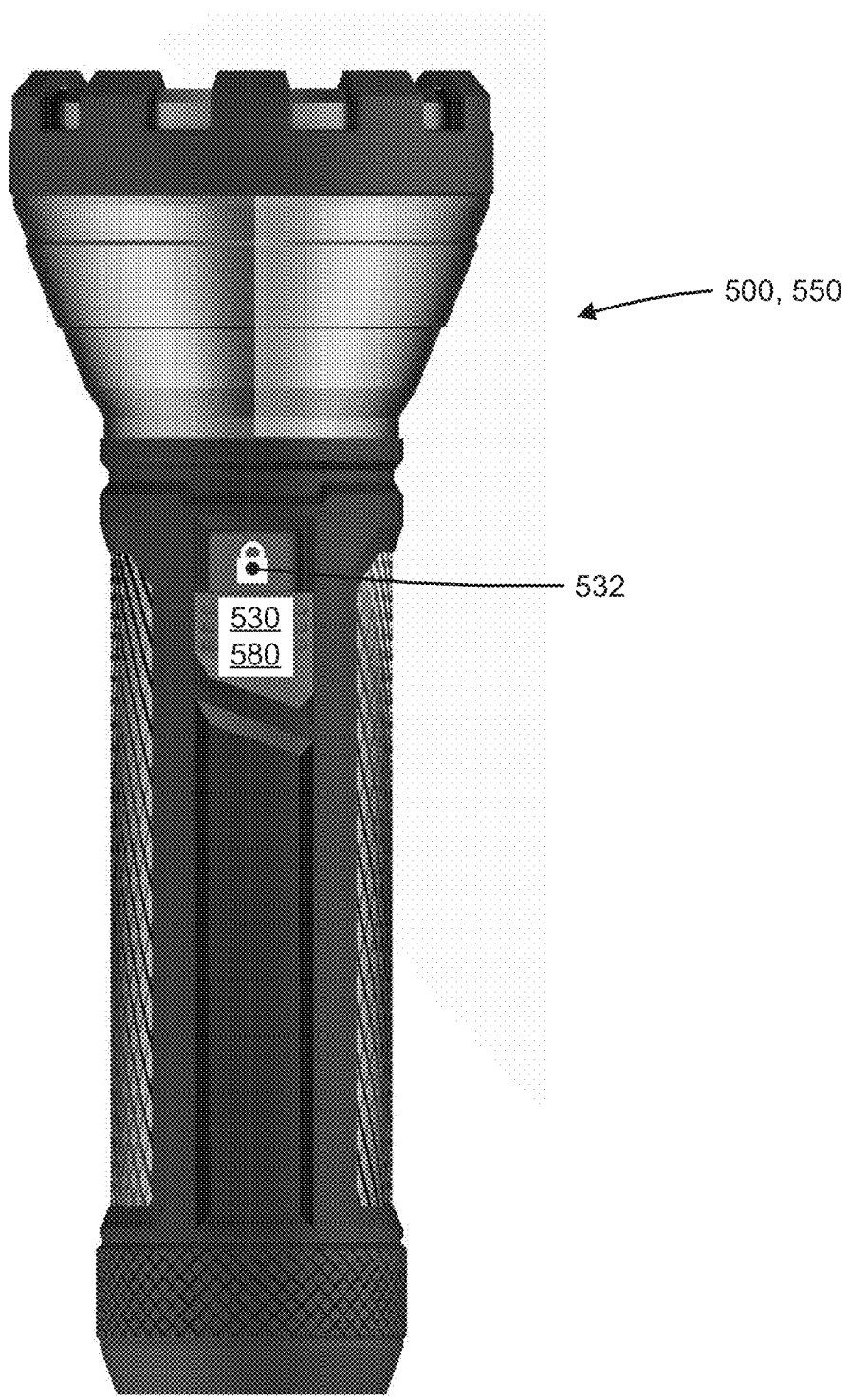
FIG. 23 shows an exterior view of an embodiment of the flashlights of FIG. 19, FIG. 20, FIG. 21, and FIG. 22.

FIG. 23 shows an exterior view of an embodiment of the flashlight 500, 550 in the off configuration. In the illustrated embodiment, a battery isolation symbol 532 is visible when the sliding member 530, 580 is in the off position and is covered by the sliding member 530, 580 when the sliding member 530, 580 is in the on position. In a similar manner, the flashlight 500, 550 can include a suitable "on" symbol that is visible when the sliding member 530, 580 is in the on position and covered by the sliding member 530, 580 when the sliding member 530, 580 is in the off position.

Figure 24:
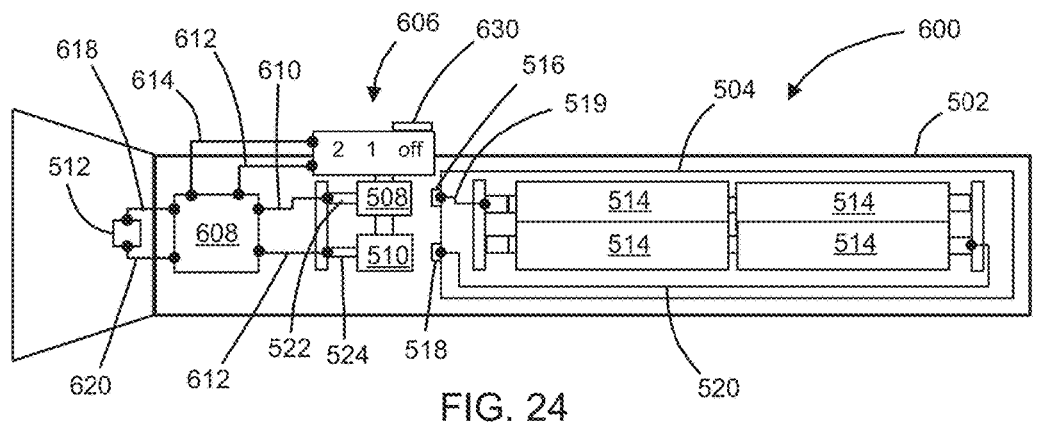
FIG. 24, FIG. 25, and FIG. 26 show simplified cross-sectional schematic illustrations of a flashlight that includes a user-operated switching mechanism operable to electrically isolate a battery cartridge when the flashlight is off and select an operational mode for the flashlight when the flashlight is on, in accordance with many embodiments.
Figure 25:
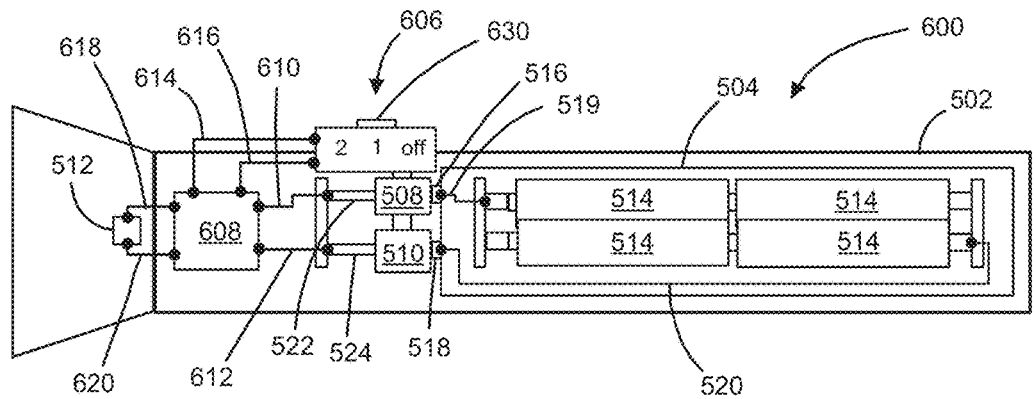
Figure 26:
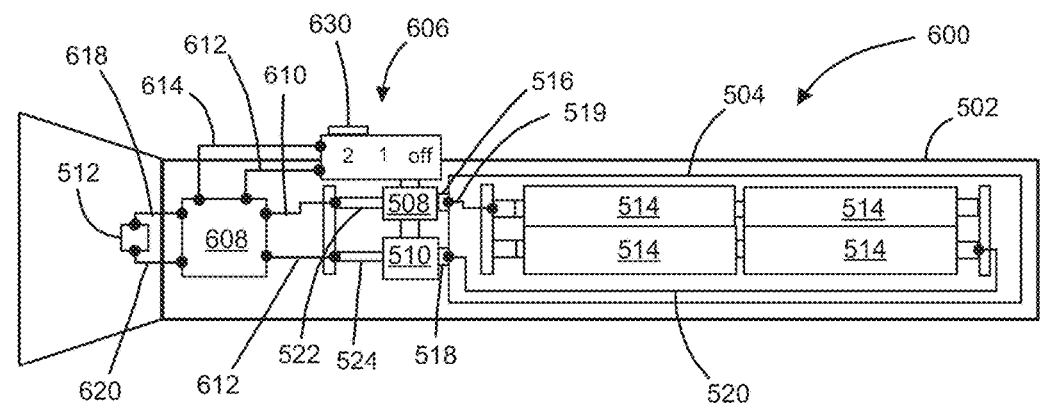

FIG. 24, FIG. 25, and FIG. 26 schematically illustrate a flashlight 600 that includes a user-operated switching mechanism 606 operable to electrically isolate the battery cartridge 504 when the flashlight 600 is off and select an operational mode for the flashlight 600 when the flashlight 600 is on, in accordance with many embodiments. Some of the components of the flashlight 600 are the same or similar to the components of the flashlight 500 and are labeled with the same reference numbers. The description of these common or similar components set forth herein with respect to the flashlight 500 are applicable to the flashlight 600 and are therefore not repeated here. The flashlight 600 can be configured similar to the flashlight 550 with respect to articulation of contacts to selectively isolate the battery cartridge 554.

In the illustrated embodiment, the flashlight 600 includes the housing 502, the battery cartridge 504, the user-operated switching mechanism 606, the articulable positive contact 508, the articulable negative contact 510, and the light generating element 512. The flashlight 600 further includes a control unit 608 (e.g., a suitable control circuit) that is operatively coupled with the positive and negative contacts 508, 510 via conductive paths 610, 612 and the conductive spring assemblies 522, 524, the user-operated switching mechanism 606 via conductive paths 614, 616, and the light generating element 512 via conductive paths 618, 620. The control unit 608 is configured to control supply of electrical power to the light generating element 512 to operate the light generating element 512 in an operational mode selected via the user-operated switching mechanism 606.

The user-operated switching mechanism 606 is drivingly coupled with the articulable positive contact 508 and the articulable negative contact 510 for reconfiguring the flashlight 600 between the "off" configuration illustrated in FIG. 24 and the on configurations (1), (2) illustrated in FIG. 25 and FIG. 26, respectively. In the illustrated embodiment, the user-operated switching mechanism 606 includes a sliding member 630 that can be slid between an off position (off) as shown in FIG. 24, the on position (1) shown in FIG. 25, and the on position (2) shown in FIG. 26. When the sliding member 630 is moved to the off position shown in FIG. 24, the user-operating switching mechanism 606 displaces the positive and negative contacts 508, 510 away from the positive and negative terminals 516, 518, thereby separating and electrically disconnecting the positive contact 508 from the positive terminal 516 and the negative contact 510 from the negative terminal 518. In the configuration illustrated in FIG. 24, the battery cartridge 504 is electrically isolated, thereby inhibiting parasitic drain of the batteries 514. When the sliding member 630 is moved from the off position shown in FIG. 24 to the on position (1) shown in FIG. 25, the user-operating switching mechanism 606 reconfigures to accommodate movement of the positive and negative contacts 508, 510 towards the positive and negative terminals 516, 518, thereby allowing the first conductive spring assembly 522 to move the positive contact 508 into contact with the positive terminal 516 and allowing the second conductive spring assembly 524 to move the negative contact 510 into contact with the negative terminal 518. In the configuration illustrated in FIG. 25, the light generating element 512 is electrically coupled with the battery cartridge 504 and is operated in a first operational mode (e.g., a low intensity operation of the light generating element 512) via electrical current from the batteries 514. When the sliding member 630 is moved from the on position (1) shown in FIG. 25 to the on position (2) shown in FIG. 26, the user-operated switching mechanism 606 continues to accommodate contact between the positive and negative contacts 508, 510 and the positive and negative terminals 516, 518 and the operational mode of the flashlight is changed to a second operational mode (e.g., high intensity operation of the light generating element 512). In the illustrated embodiment, the user-operated switching mechanism 606 is configured to indicate the selected operational mode to the control unit 608 via the conductive paths 614, 616. For example, the control unit 608 can output a signal voltage to the user-operated switching mechanism 606 via the conductive path 614 and the user-operated switching mechanism 606 can include a switch that electrically connects the conductive path 616 to the conductive path 614 when the sliding member is in the on position (2) and opens to electrically isolate the conductive path 616 from the conductive path 614 when the sliding member 630 is in the on position (1).

Figure 27:
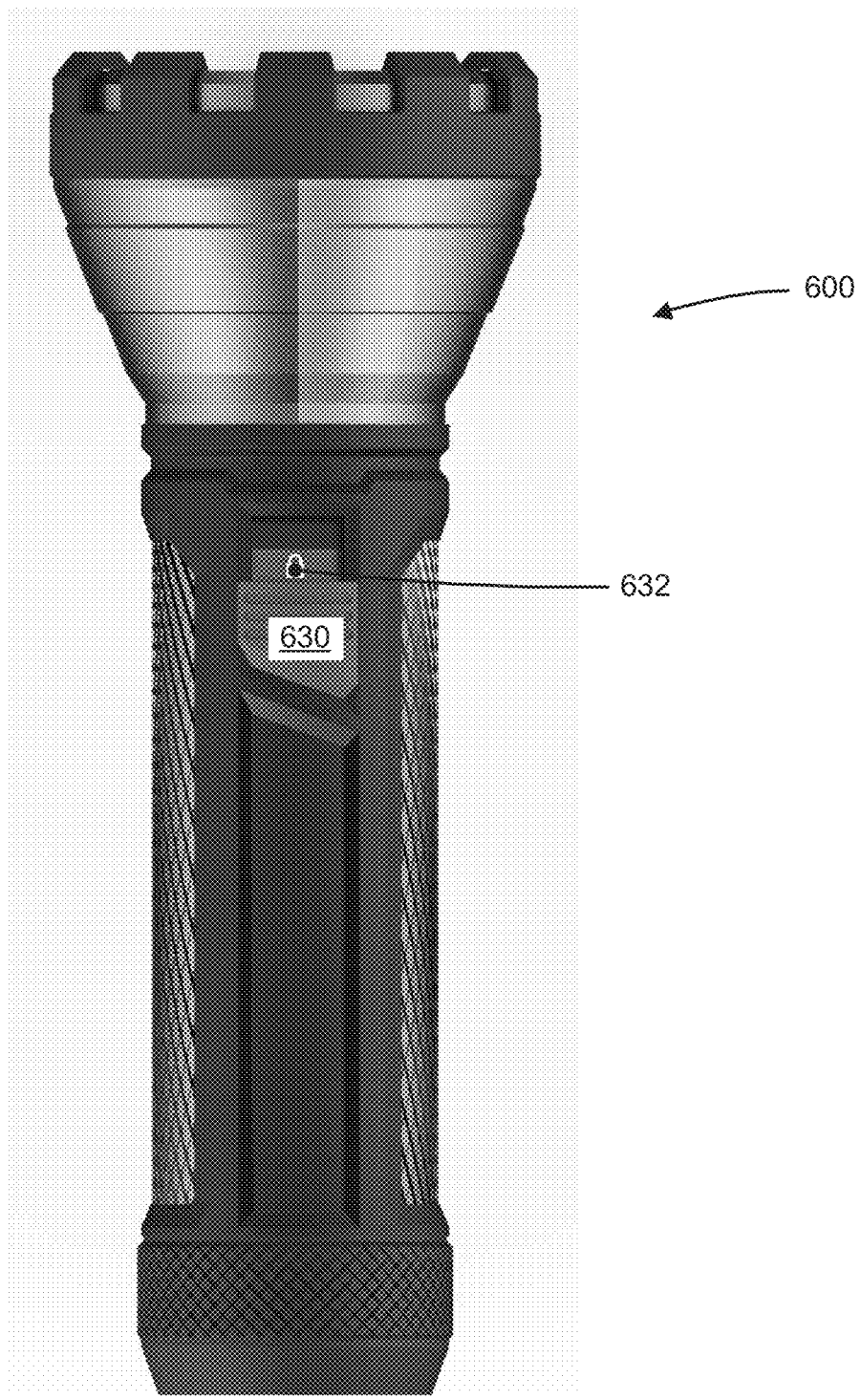
FIG. 27 shows an exterior view of an embodiment of the flashlight of FIG. 24, FIG. 25, and FIG. 26.

FIG. 27 shows an exterior view of an embodiment of the flashlight 600 in the off configuration of FIG. 24. In the illustrated embodiment, a battery isolation symbol 632 is visible when the sliding member 630 is in the off position and is covered by the sliding member 630 when the sliding member 630 is in each of the on positions (1), (2). In a similar manner, the flashlight 600 can include suitable on symbols, each of which can be visible when the sliding member 630 is in the corresponding position and covered by the sliding member 630 when the sliding member 630 is in the off position.

FIG. 28 and FIG. 29 schematically illustrate a flashlight 700 that includes a first user-operated switching mechanism 702 operable to electrically isolate the battery cartridge 504 when the flashlight 700 is off and a second user-operable switching mechanism 704 operable to select an operational mode for the flashlight 700 when the flashlight 700 is on, in accordance with many embodiments. Some of the components of the flashlight 700 are the same or similar to the components of the flashlight 500 and are labeled with the same reference numbers. The description of these common or similar components set forth herein with respect to the flashlight 500 are applicable to the flashlight 700 and are therefore not repeated here. The flashlight 700 can be configured similar to the flashlight 550 with respect to articulation of contacts to selectively isolate the battery cartridge 554.

In the illustrated embodiment, the flashlight 700 includes the housing 502, the battery cartridge 504, the first user-operated switching mechanism 702, the second user-operated switching mechanism 704, the articulable positive contact 508, the articulable negative contact 510, and the light generating element 512. The flashlight 700 further includes a control unit 706 (e.g., a suitable control circuit) that is operatively coupled with the positive and negative contacts 508, 510 via conductive paths 708, 710 and the conductive spring assemblies 522, 524, the second user-operated switching mechanism 706 via conductive paths 712, 714, and the light generating element 512 via conductive paths 716, 718. The control unit 706 is configured to control supply of electrical power to the light generating element 512 to operate the light generating element 512 in an operational mode selected via the second user-operated switching mechanism 704.

The first user-operated switching mechanism 702 is drivingly coupled with the articulable positive contact 508 and the articulable negative contact 510 for reconfiguring the flashlight 700 between the "off" configuration illustrated in FIG. 28 and the "on" configuration illustrated in FIG. 29. In the illustrated embodiment, the first user-operated switching mechanism 702 includes a sliding member 720 that can be slid between an off position as shown in FIG. 28 and the on position shown in FIG. 29. When the sliding member 720 is moved to the off position shown in FIG. 28, the first user-operating switching mechanism 702 displaces the positive and negative contacts 508, 510 away from the positive and negative terminals 516, 518, thereby separating and electrically disconnecting the positive contact 508 from the positive terminal 516 and the negative contact 510 from the negative terminal 518. In the configuration illustrated in FIG. 28, the battery cartridge 504 is electrically isolated, thereby inhibiting parasitic drain of the batteries 514. When the sliding member 720 is moved from the off position shown in FIG. 28 to the on position shown in FIG. 29, the first user-operating switching mechanism 702 reconfigures to accommodate movement of the positive and negative contacts 508, 510 towards the positive and negative terminals 516, 518, thereby allowing the first conductive spring assembly 522 to move the positive contact 508 into contact with the positive terminal 516 and allowing the second conductive spring assembly 524 to move the negative contact 510 into contact with the negative terminal 518.

In the configuration illustrated in FIG. 29, the light generating element 512 is electrically coupled with the battery cartridge 504 and is operated in an operational mode selected via the second user-operated switching mechanism 704. For example, the second user-operated switching mechanism 704 can be configured to enable selection between a low intensity operation of the light generating element 512 and a high intensity operation of the light generating element 512. In the illustrated embodiment, the second user-operated switching mechanism 704 is configured to indicate the selected operational mode to the control unit 706 via the conductive paths 712, 714. For example, the control unit 706 can output a signal voltage to the second user-operated switching mechanism 704 via the conductive path 712 and the second user-operated switching mechanism 704 can include a switch that electrically connects the conductive path 714 to the conductive path 712 when a second operational mode is selected via the second user-operated switching mechanism 704 and opens to electrically isolate the conductive path 714 from the conductive path 712 when a first operational mode is selected via the second user-operated switching mechanism 704. As another example, the second user-operated switching mechanism 704 can be configured to enable selection of any desired intensity of operation of the light generating element 512 in a range of intensities (e.g., zero intensity to a high intensity) and to vary the voltage outputted to the control unit 706 via the conductive path 714 in accordance with the selected intensity of operation.

Figure 30:
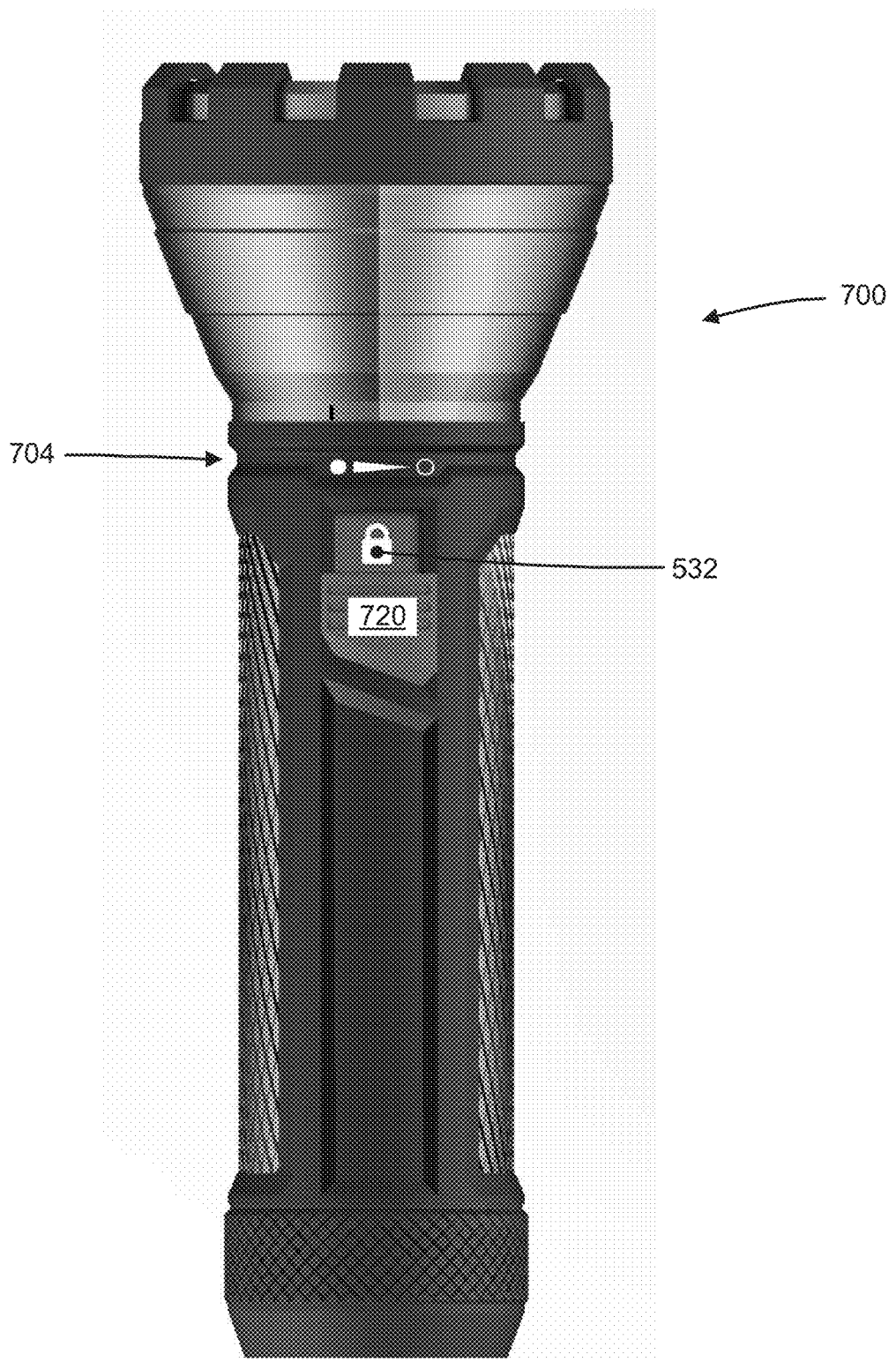
FIG. 30 shows an exterior view of an embodiment of the flashlight of FIG. 28 and FIG. 29.

FIG. 30 shows an exterior view of an embodiment of the flashlight 700 in the off configuration of FIG. 28. In the illustrated embodiment, a battery isolation symbol 532 is visible when the sliding member 720 is in the off position and is covered by the sliding member 720 when the sliding member 720 is in the on position. In a similar manner, the flashlight 700 can include a suitable on symbols that is visible when the sliding member 720 is in the on position and covered by the sliding member 720 when the sliding member 720 is in the off position. In the illustrated embodiment, the second user-operated switching mechanism 704 includes a selection member 722 that is rotatable around a longitudinal axis of the flashlight 700 to enable selection of any desired intensity of operation of the light generating element 512 in a range of intensities from zero intensity mode of operation (i.e., off) of the light generating element 512 to a high intensity mode of operation of the light generating element 512.

FIG. 31 and FIG. 32 schematically illustrate a flashlight 800 that includes a first user-operated switching mechanism 802 operable to electrically isolate the battery cartridge 504 when the flashlight 800 is off and a mode-selection button 804 operable to select an operational mode for the flashlight 800 when the flashlight 800 is on, in accordance with many embodiments. Some of the components of the flashlight 800 are the same or similar to the components of the flashlight 500 and are labeled with the same reference numbers. The description of these common or similar components set forth herein with respect to the flashlight 500 are applicable to the flashlight 800 and are therefore not repeated here. The flashlight 800 can be configured similar to the flashlight 550 with respect to articulation of contacts to selectively isolate the battery cartridge 554.

In the illustrated embodiment, the flashlight 800 includes the housing 502, the battery cartridge 504, the first user-operated switching mechanism 802, the mode-selection button 804, the articulable positive contact 508, the articulable negative contact 510, and the light generating element 512. The flashlight 800 further includes a control unit 806 (e.g., a suitable control circuit) that is operatively coupled with the positive and negative contacts 508, 510 via conductive paths 808, 810 and the conductive spring assemblies 522, 524, the mode-selection button 804 via conductive paths 812, 814, and the light generating element 512 via conductive paths 816, 818. The control unit 806 is configured to control supply of electrical power to the light generating element 512 to operate the light generating element 512 in an operational mode selected via the mode-selection button 804.

The first user-operated switching mechanism 802 is drivingly coupled with the articulable positive contact 508 and the articulable negative contact 510 for reconfiguring the flashlight 800 between the "off" configuration illustrated in FIG. 31 and the "on" configuration illustrated in FIG. 32. In the illustrated embodiment, the first user-operated switching mechanism 802 includes a sliding member 820 that can be slid by a user between the off position illustrated in FIG. 31 and the on position illustrated in FIG. 32. When the sliding member 820 is moved to the off position illustrated in FIG. 31, the first user-operating switching mechanism 802 displaces the positive and negative contacts 508, 510 away from the positive and negative terminals 516, 518, thereby separating and electrically disconnecting the positive contact 508 from the positive terminal 516 and the negative contact 510 from the negative terminal 518. In the configuration illustrated in FIG. 31, the battery cartridge 504 is electrically isolated, thereby inhibiting parasitic drain of the batteries 514. When the sliding member 820 is moved from the off position shown in FIG. 32 to the on position shown in FIG. 31, the first user-operating switching mechanism 802 reconfigures to accommodate movement of the positive and negative contacts 508, 510 towards the positive and negative terminals 516, 518, thereby allowing the first conductive spring assembly 522 to move the positive contact 508 into contact with the positive terminal 516 and allowing the second conductive spring assembly 524 to move the negative contact 510 into contact with the negative terminal 518.

In the configuration illustrated in FIG. 32, the light generating element 512 is electrically coupled with the battery cartridge 504 and is operated in an operational mode selected via the mode-selection button 804. For example, the mode-selection button 804 can be configured to enable a user to cycle through a plurality of different operational modes (e.g., off, low intensity, high intensity, strobe) for the light generating element 512. In the illustrated embodiment, the mode-selection button 804 is configured to indicate the selected operational mode to the control unit 806 via the conductive paths 812, 814. For example, the control unit 806 can output a signal voltage to the mode-selection button 804 via the conductive path 812 and the mode-selection button 704 can output a voltage to the control unit 806 in accordance with the selected operational mode.

Figure 33:
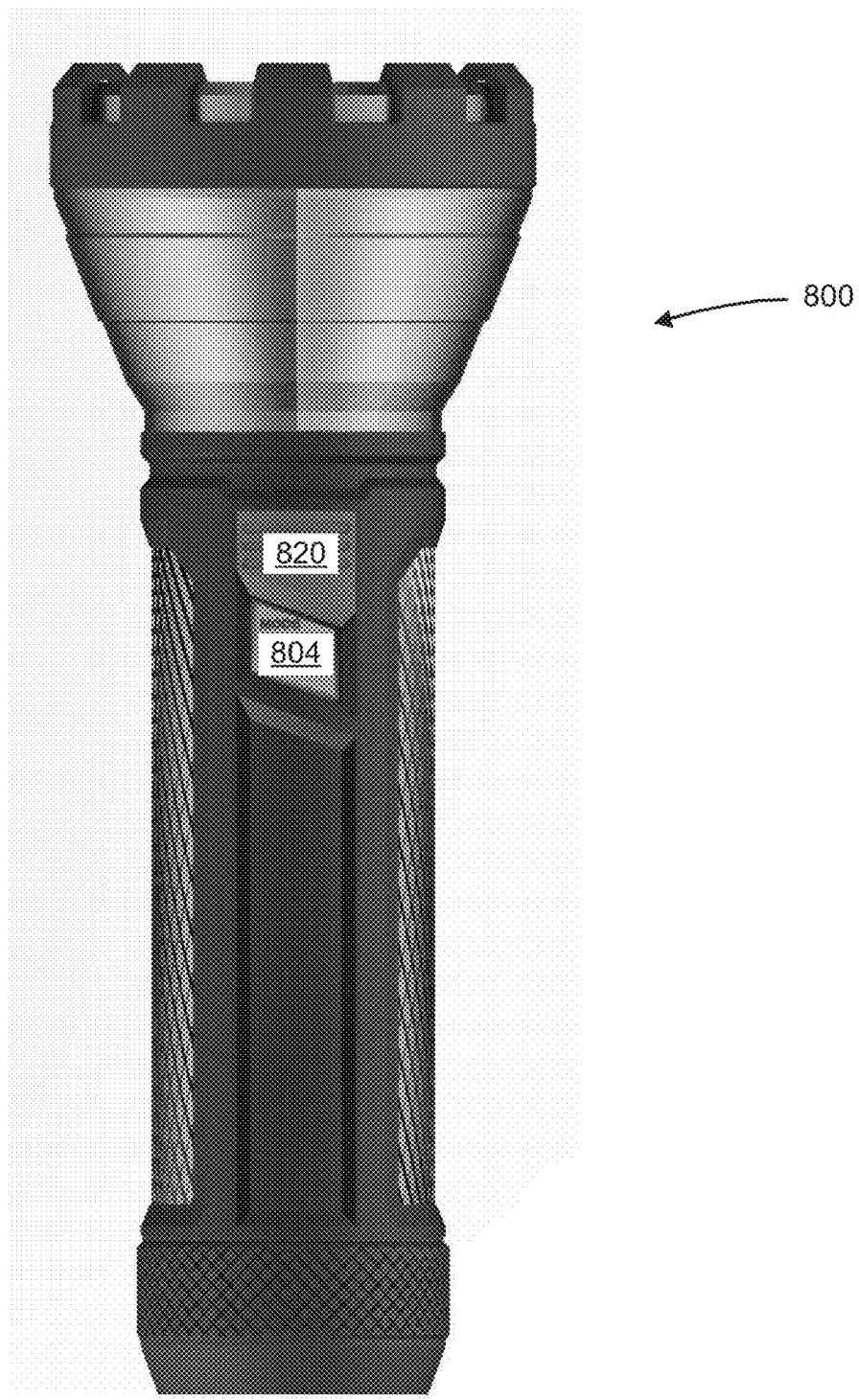
FIG. 33 shows an exterior view of an embodiment of the flashlight of FIG. 31 and FIG. 32.

FIG. 33 shows an exterior view of an embodiment of the flashlight 800 in the on configuration of FIG. 32. In the illustrated embodiment, the mode-selection button 804 is accessible when the sliding member 820 is in the on position and is covered by the sliding member 820 when the sliding member 820 is in the off position. In a similar manner, the flashlight 800 can include a suitable "off" symbol that is visible when the sliding member 820 is in the off position and covered by the sliding member 820 when the sliding member 820 is in the on position.

Other variations are within the spirit of the present invention. Thus, while the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A lighting device comprising:
   a housing configured to accommodate a battery assembly that includes one or more batteries;
   a light generating element supported by the housing;
   a first switching mechanism including an articulable positive contact and an articulable negative contact, the first switching mechanism being configurable by a user to:
   (a) a first configuration in which the positive contact contacts a positive terminal of the battery assembly, the negative contact contacts a negative terminal of the battery assembly, and the light generating element is electrically coupled with the articulable positive contact and the articulable negative contact to receive electric power from the battery assembly to generate light; and
   (b) a second configuration in which the positive contact is separated from the positive terminal and the negative contact is separated from the negative terminal to electrically isolate the battery assembly;
   a second switching mechanism comprising a selection member that is rotatable relative to the housing by the user to select a desired intensity of operation of the light generating element in a range of intensities between a low intensity mode and a high intensity mode of operation when the first switching mechanism is in the first configuration; and
   a control unit operatively coupled with the light generating element, the control unit being configured to control supply of electrical power to the light generating element to operate the light generating element in a range of intensities from the low intensity mode to the high intensity mode of operation when the user selects a desired intensity of operation.

2. The lighting device of claim 1, wherein:
   the battery assembly comprises a battery cartridge configured to accommodate a plurality of batteries; and
   the battery cartridge includes the positive terminal of the battery assembly, a positive voltage path configured to electrically connect the positive terminal of the battery assembly with a positive terminal of the plurality of batteries, the negative terminal of the battery assembly, and a negative voltage path configured to electrically connect the negative terminal of the battery assembly with a negative terminal of the plurality of batteries.

3. The lighting device of claim 2, wherein the battery cartridge is configured to accommodate the plurality of batteries in a serially-connected configuration to generate a resulting voltage used to operate the light generating element.

4. The lighting device of claim 3, wherein the positive terminal of the battery assembly and the negative terminal of the battery assembly are disposed at one end of the battery cartridge.

5. A lighting device comprising:
   a housing configured to accommodate a battery assembly that includes one or more batteries;
   a light generating element supported by the housing;
   a first switching mechanism including an articulable positive contact and an articulable negative contact, the first switching mechanism being configurable by a user to:
   (a) a first configuration in which the positive contact contacts a positive terminal of the battery assembly, the negative contact contacts a negative terminal of the battery assembly, and the light generating element is electrically coupled with the articulable positive contact and the articulable negative contact to receive electric power from the battery assembly to generate light; and
   (b) a second configuration in which the positive contact is separated from the positive terminal and the negative contact is separated from the negative terminal to electrically isolate the battery assembly;
   a second switching mechanism operable by the user to select an operational mode of the light generating element when the first switching mechanism is in the first configuration; and
   a control unit operatively coupled with the light generating element, the control unit being configured to control supply of electrical power to the light generating element to operate the light generating element in an operational mode selected by the user via the second switching mechanism,
   wherein the second switching mechanism comprises a mode selection button operatively coupled with the control unit and operable by the user to cycle through a plurality of operational modes for the light generating element, and
   wherein the first switching mechanism physically blocks use of the mode selection button by the user when in the second configuration and accommodates operation of the mode selection button by the user when slid into the first configuration.

6. A method for electrically isolating a battery assembly of a lighting device to inhibit parasitic drain of the battery assembly, the method comprising:
   maintaining contact between an articulable positive contact and a positive terminal of the battery assembly while a first user-operable switching mechanism of the lighting device is in a first configuration, the first user-operable switching mechanism being drivingly coupled with the articulable positive contact, the articulable positive contact being electrically connected with a light generating element of the lighting device;
   maintaining contact between an articulable negative contact and a negative terminal of the battery assembly while the first user-operable switching mechanism is in the first configuration, the first user-operable switching mechanism being drivingly coupled with the articulable negative contact, the articulable negative contact being electrically connected with a light generating element of the lighting device;
   separating the articulable positive contact from the positive terminal of the battery assembly and the articulable negative contact from the negative terminal of the battery assembly to electrically isolate the battery assembly in response to reconfiguration of the first user-operable switching mechanism from the first configuration to a second configuration;
   controlling, via a control unit operatively coupled with a second user-operable switching mechanism, supply of electrical power to the light generating element to operate the light generating element in a range of intensities between a low intensity mode and a high intensity mode of operation selected via the second user-operable switching mechanism; and outputting a signal from the second user-operable switching mechanism to the control unit corresponding to a rotational orientation of a selection member of the second user-operable switching mechanism, the signal being indicative of the selected operational intensity.

7. The method of claim 6, further comprising controlling, via a control unit included in the lighting device, supply of electrical power to the light generating element to operate the light generating element in a first operational mode when the first user-operable switching mechanism is in the first configuration.

8. The method of claim 7, further comprising controlling, via the control unit, supply of electrical power to the light generating element to operate the light generating element in a second operational mode when the first user-operable switching mechanism is in a third configuration in which the articulable positive contact contacts a positive terminal of the battery assembly and the articulable negative contact contacts a negative terminal of the battery assembly, the second operational mode being different from the first operational mode.

9. The method of claim 6, further comprising:
accommodating a battery cartridge within the lighting device, the battery cartridge being configured to accommodate a plurality of batteries and including the positive terminal of the battery assembly and the negative terminal of the battery assembly;
electrically coupling the positive terminal of the battery assembly with a positive terminal of the plurality of batteries; and
electrically coupling the negative terminal of the battery assembly with a negative terminal of the plurality of batteries.

10. The method of claim 9, wherein the battery cartridge housing is configured to accommodate the plurality of batteries in a serially-connected configuration to generate a resulting voltage used to operate the light generating element.

11. The method of claim 10, further comprising supporting the positive terminal of the battery assembly and the negative terminal of the battery assembly at one end of the battery cartridge.

12. A method for electrically isolating a battery assembly of a lighting device to inhibit parasitic drain of the battery assembly, the method comprising:
maintaining contact between an articulable positive contact and a positive terminal of the battery assembly while a first user-operable switching mechanism of the lighting device is in a first configuration, the first user-operable switching mechanism being drivingly coupled with the articulable positive contact, the articulable positive contact being electrically connected with a light generating element of the lighting device;
maintaining contact between an articulable negative contact and a negative terminal of the battery assembly while the first user-operable switching mechanism is in the first configuration, the first user-operable switching mechanism being drivingly coupled with the articulable negative contact, the articulable negative contact being electrically connected with a light generating element of the lighting device;
separating the articulable positive contact from the positive terminal of the battery assembly and the articulable negative contact from the negative terminal of the battery assembly to electrically isolate the battery assembly in response to reconfiguration of the first user-operable switching mechanism from the first configuration to a second configuration;
controlling, via a control unit operatively coupled with a second user-operable switching mechanism, supply of electrical power to the light generating element to operate the light generating element in an operational mode selected via the second user-operable switching mechanism, wherein the second user-operable switching mechanism includes a mode selection button;
outputting a signal from the mode selection button to the control unit corresponding to a selected operational mode for operating the light generating element, the mode selection button being operable to cycle through a plurality of operational modes for the light generating element;
physically blocking use access to the mode selection button when the first user-operable switching mechanism is in the second configuration; and
accommodating operational access to the mode selection button when the first user-operable switching mechanism is slid into the first configuration.

* * * * *